United States Patent
Heins et al.

(10) Patent No.: US 8,768,307 B1
(45) Date of Patent: Jul. 1, 2014

(54) METHODS AND DEVICES FOR REMOTE PROCESSING OF MESSAGES, AND PERFORMING USER TRACKING AND MONITORING WITH RESPECT TO DATA ORIGINATING FROM A MOBILE COMMUNICATION DEVICE

(75) Inventors: Douglas Brian Heins, San Francisco, CA (US); Gregory Michael Morey, New York, NY (US)

(73) Assignee: ZeroTouch Digital, Inc., New York, NY (US)

( * ) Notice: Subject to any disclaimer, the term of this patent is extended or adjusted under 35 U.S.C. 154(b) by 1701 days.

(21) Appl. No.: 12/198,518

(22) Filed: Aug. 26, 2008

Related U.S. Application Data

(63) Continuation-in-part of application No. 12/108,284, filed on Apr. 23, 2008.

(51) Int. Cl.
| | |
|---|---|
| *H04M 1/725* | (2006.01) |
| *H04M 11/10* | (2006.01) |
| *H04M 3/42* | (2006.01) |
| *H04M 3/493* | (2006.01) |
| *H04H 40/00* | (2008.01) |
| *H04W 4/00* | (2009.01) |
| *G06Q 30/00* | (2012.01) |
| *G06F 15/16* | (2006.01) |

(52) U.S. Cl.
USPC .... 455/412.1; 455/3.06; 455/413; 455/414.1; 455/414.2; 455/466; 705/14.55; 705/14.69; 709/203

(58) Field of Classification Search
USPC ............... 455/412.1, 3.06, 413, 414.1, 414.2, 455/466; 705/14.55, 14.69; 709/203
See application file for complete search history.

(56) References Cited

U.S. PATENT DOCUMENTS

| 5,835,061 A | 11/1998 | Stewart |
|---|---|---|
| 6,452,498 B2 | 9/2002 | Stewart |

(Continued)

OTHER PUBLICATIONS

AT&T Smart Limits for Wireless, printed on Mar. 18, 2008, http://www.wireless.att.com/learn/articles-resources/parental-controls/smart-limits.jsp?source=EX76... (2 pgs.).

(Continued)

*Primary Examiner* — Inder Mehra
(74) *Attorney, Agent, or Firm* — DLA Piper LLP (US)

(57) ABSTRACT

In part the invention relates to a method of providing remote access to data generated by a mobile device having a device storage element. The method includes the steps of monitoring the mobile device such that changes in local data resident in the device storage element are detected using a client application installed on the mobile device, wherein the changes in the local data accumulate during a period of time to comprise at least one change set; transmitting the at least one change set over a network; receiving the at least one change set at a remote server, the remote server having a remote storage element; and processing the at least one change set using a server application to generate user accessible remote data. Various embodiments further involve remote text message archives, positional and temporal information associated with change sets, alert generation by trigger events, and archiving with associated searchable meta-data for data mining.

42 Claims, 30 Drawing Sheets

(56) References Cited

U.S. PATENT DOCUMENTS

| | | | | |
|---|---|---|---|---|
| 7,130,616 | B2 * | 10/2006 | Janik | 455/412.1 |
| 7,965,981 | B2 * | 6/2011 | Bloebaum et al. | 455/41.1 |
| 8,095,670 | B2 * | 1/2012 | Brown et al. | 709/229 |
| 2007/0207793 | A1 * | 9/2007 | Myer et al. | 455/419 |
| 2008/0045236 | A1 * | 2/2008 | Nahon et al. | 342/357.06 |
| 2008/0057911 | A1 * | 3/2008 | Lauper | 455/412.1 |
| 2009/0005010 | A1 * | 1/2009 | Dote et al. | 455/412.1 |
| 2009/0061824 | A1 * | 3/2009 | Neelakantan et al. | 455/412.1 |

OTHER PUBLICATIONS

"A Phone for Them—No Worries for You," printed on Mar. 14, 2008, The New AT&T Your World Delivered (2 pgs.).

"Google's Wi-Fi Patent May Face Wayport Challenges," WNN Wi-Fi Net News, Mar. 29, 2006, http://wifinetnews.com/archives/006431.html (3 pgs.).

"AT&T Offers Service to Control Children Mobile Phone Use," Cell Phone Digest, Sep. 4, 2007, http://www.cellphonedigest.net/news/2007/09/att_offers_service_to_control.php.

* cited by examiner

METHODS AND DEVICES FOR REMOTE PROCESSING OF MESSAGES, AND PERFORMING USER TRACKING AND MONITORING WITH RESPECT TO DATA ORIGINATING FROM A MOBILE COMMUNICATION DEVICE

RELATED APPLICATIONS

This application claims priority to U.S. patent application Ser. No. 12/108,284 filed on Apr. 23, 2008, the disclosure of which is incorporated by reference herein.

FIELD OF INVENTION

Various embodiments of the invention relate to monitoring a mobile communication device to detect changes and provide enhanced services to the user of the device. Specifically, various embodiments relate to the automatic processing, transmission, tracking, and/or remote storing of information originating from, captured by or otherwise accessible on the mobile device.

BACKGROUND OF THE INVENTION

Mobile communication devices such as phones, laptops, personal digital assistants, content players, and other similar devices are now pervasive in many parts of the world. In many developing countries, since cellular phone based systems are easier to install and offer the immediate benefit of portability to the end users, a landline based telephone system is not being developed. As a result, given the rising dominance of mobile devices relative to land lines, many changes are occurring in the telecommunication business.

On a related note, as more and more features are being integrated into modern communications devices (cameras, positioning systems, video and music playing functionality, etc.) end users are relying on these devices and using them as a multi-function replacement for many application specific electronic devices. However, storing information on a mobile devices and using it as a replacement for various application specific devices, such as a camera or a global position system (GPS) device, raises challenges and problems not found in the stand alone devices.

Therefore, a need exists for devices, methods and systems that address the underlying data management challenges and user tracking options associated with the worldwide shift toward using mobile communication devices in lieu of land lines and other application specific devices.

BRIEF DESCRIPTION OF THE DRAWINGS

Various embodiments and other aspects of this invention will be readily apparent from the detailed description below and the appended drawings, which are meant to illustrate and not to limit the invention, and in which.

DETAILED DESCRIPTION

Figure 1:
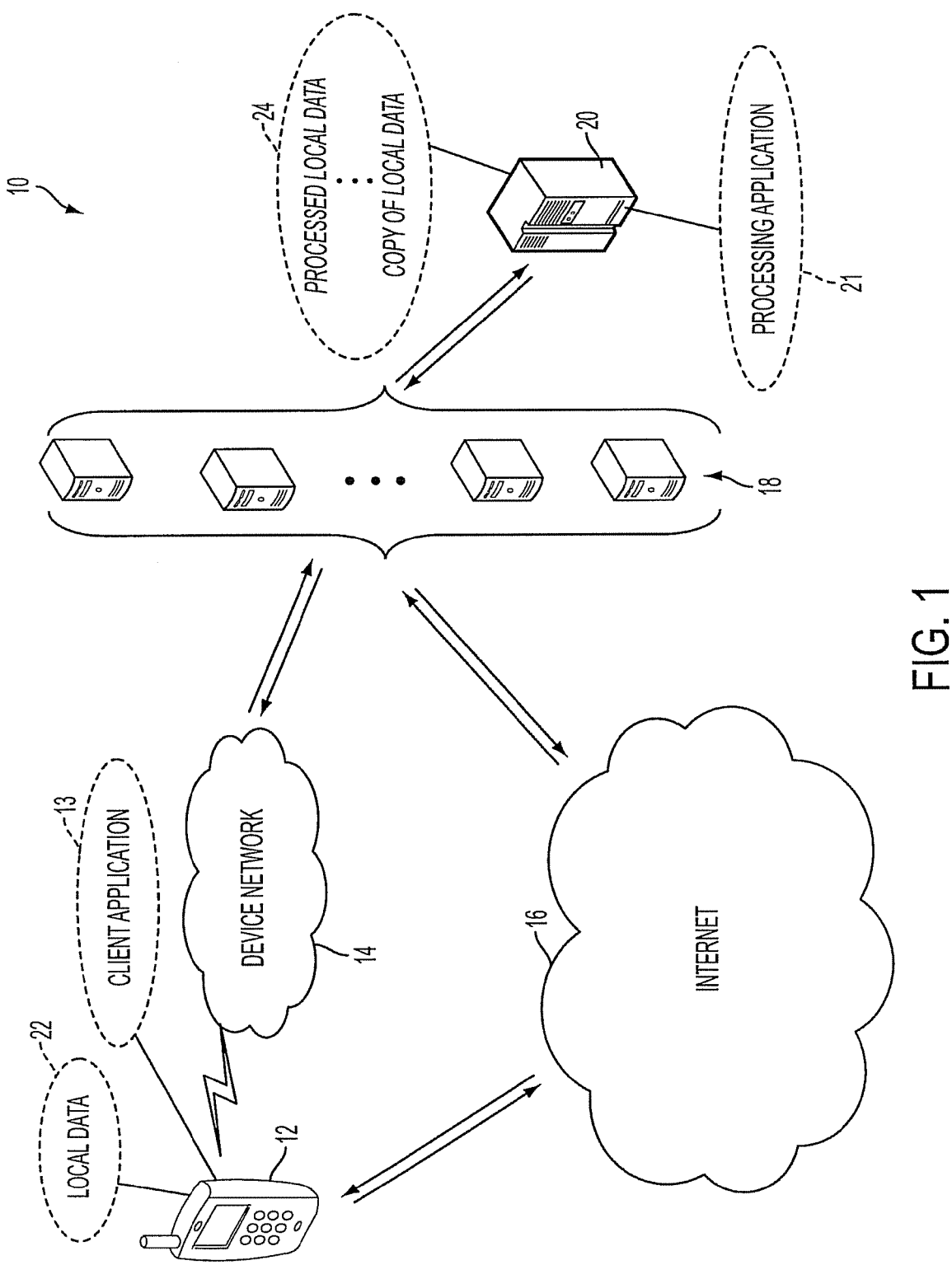
FIG. 1 is a diagram illustrating a network-based system suitable for implementing an embodiment of the invention.

In general, embodiments of the invention use various communication protocols and networks to monitor changes in certain categories of data associated with, resident on, captured using, or otherwise generated by a user's mobile device. In addition, embodiments also relate to the use of any type of data that is processed remotely in response to data sent from the mobile device. As a result, the embodiments of the invention relate to any type of data suitable for use by mobile devices and processors. The data can include, but is not limited to any suitable type of data such as metadata, local data, device-generated data, user-generated or inputted data, and various types of derived data, all of which may be the same, different, or overlap with respect to data type in some embodiments.

In one embodiment, the invention relates to systems, methods, and devices that monitor changes in a mobile device, and enable automatic (or user controlled) processing (or archiving) and tracking of information generated using the mobile device. In part, one embodiment relates to monitoring changes in certain metadata, such as the local data, using the temporal data and the positional data, the change in local data indicative of a user action. The underlying metadata associated with the information generated using the mobile device is also stored for processing in one embodiment. According to one embodiment, device-generated data, user-generated or inputted data, and various types of derived data (all of which may be types of metadata) are also stored, processed, and transmitted. Some of these different types of data are discussed in more detail below.

Further, according to one embodiment, the information generated using the mobile device is transmitted to a remote user accessible device for processing and/or storage. The information generated using the mobile device may include a change set indicative of new information existing on the mobile device relative to a previous point in time. The change set can include, but is not limited to change event data, any changed data or a portion thereof, and any related metadata. In addition, systems and methods described herein may be bi-directional such that data can be both sent from and sent to a mobile device.

In one preferred embodiment, the invention allows photos generated using the camera of (or otherwise transmitted to) the mobile device to be subsequently transmitted to a remote location for further processing or archiving. In one specific preferred embodiment, the further processing includes moving a user's pictures from their mobile device to a browser accessible photo archive in response to a user action or automatically as configured by the device user. The use of the camera features associated with many mobile devices allows embodiments of the invention to be extended to any imaging-based capture system. For example, the mobile device can be used to "image" or photograph a symbol, such as a barcode. Once captured, the barcode can be routed to a remote server or remote peer for processing by a digital imaging application. In this way, a barcode can be used to order goods and services using one embodiment of the invention.

The techniques disclosed herein enable the remote archiving or remote processing of any suitable type of file, data, or content generated using a mobile device. Thus, logs for calls made and received, text messages, personal notes, voice memos such as dictation files, emails, voicemails, pictures, and other content or media files generated using a mobile device can all be processed remotely or archived as desired using the methods and devices disclosed herein. In one embodiment, the methods described herein are activated in response to a single user action. This single user action can include, but is not limited to turning the mobile device "on," selecting an application from a menu, sending an email, taking a picture, sending a text message, listening to a voicemail, writing a note, generating a change in the state of the mobile device, and transmitting or receiving local data.

An exemplary network based system 10 for implementing an embodiment of the invention is illustrated in FIG. 1. Specifically, as shown in the figure, a mobile communication device 12 (alternatively, a first peer) is shown that includes a software application, such as a client application or a peer-to-peer based application, 13 suitable for performing many of the transmission, data streaming, and switching functions described in more detail below. Although the software application can be a client application, the recital of the term "client application" can also be considered to encompass a peer-to-peer application 13 which is also suitable for use with the methods and devices described herein.

The client application 13 is configured to be data channel independent when selecting remote peers or processing elements to transmit and/or process data. As used herein, a peer is a device, processing element, program, or other software element that includes at least one of a software component or a hardware component suitable for transmitting data and communicating with other software or hardware devices. For example, a peer can include, but is not limited to the mobile device, the client application, a server, a browser, a database, a processing application, a digital video recorder, a cable set top box, an online photo archive, or any other suitable software or hardware element that can communicate with a mobile device.

Returning to FIG. 1, the mobile device 12 is shown transmitting data or otherwise communicating via a device network 14 or via the Internet 16. In turn, both the device network 14 and the Internet 16 are in communication with a plurality of processing elements or peers (generally 18). This group of peers 18 is in communication with an application server 20 (alternatively, a second peer) that includes a processing application 21. The processing elements or peers 18 receive local data, or a version thereof, from the mobile device 12. Additional detail relating to the type, characteristics, organization, and communication links between suitable peers or processing links is discussed below in more detail with respect to FIGS. 2A-2B and FIG. 3.

The processing elements or peer group 18 can include multiple servers. This follows because as local data is transmitted from the mobile device to a peer group, client application or related service, the data need not go to the same peer each and every time. For example, that peer may be under a load, so the client application or related service may transmit via a different server. Thus, a handheld peer, such a mobile device running the client application 13 can arbitrarily choose a peer from the group of peers 18 that has a server implementation, such as the HTTP, email, or SMS servers shown in FIG. 2A, to which it wants to connect.

In one preferred embodiment, the mobile device transmits data for remote processing using a connectionless protocol, such as a datagram based protocol. According to one embodiment, a datagram is a self-contained, independent data element carrying sufficient information to be routed from a mobile device to a destination peer, application server 20, or processing application 21 without reliance on earlier exchanges between the mobile device and destination processing element and the transporting network.

The client application 13 can include certain routines and modules suitable for modifying data sent from the mobile device to include headers, wrappers or other routing information that identifies the data as coming through a particular channel, provides mobile device authentication information, such as the International Mobile Equipment Identity ("IMEI"), identifying where the data needs to go, identifying where the data is coming from, identifying the user of the mobile device, and identifying where the local data, or a version thereof, is supposed to be sent. However, the IMEI is not the only means of authenticating information and any suitable secure identifier can be used in a given embodiment.

The client application 13 typically operates using a connectionless approach such that a persistent connection is not needed to function. Instead, when an opportunity exists to send data using any particular channel or protocol, the device 12 uses that opportunity to offload local data and transmit to a remote device. Thus, local data (or a version thereof) can be sent from the mobile device 12 using a data stream, broadcasts, email, text messages, TCP/IP, HTTP, FTP, datagrams, or other suitable data transfer protocols or transmission channels.

In addition, in one embodiment, the client application 13 uses a data flow (or streams) across one or more peers to achieve certain data transport and processing objectives. The client application 13 executes across the sum of peers required to achieve the end objective of either processing or archiving data, in one embodiment. This execution across one or more peers 18 can be performed using a routing module resident on a peer or within the client application. The function of the routing module is to capture the change set and communicate the change set once the network connection is available to transmit reliable data. Thus, the routing module employs a connectionless protocol in one embodiment.

Since the systems and methods described herein are designed to operate with mobile devices, such as smart phones, and other electronic devices that include user interfaces, the client application 13 also includes various user querying features and user controlled settings. For example, it is inherent in many mobile devices to include a query language with certain built-in questions, such as: "Do you want to send this message?" This feature and other more advanced features in graphic user interfaces incorporated in many mobile devices allow fillable forms and other queries to be presented to a mobile device user. Also, the device may include certain automatic settings for the user's email and other applications, such as whether or not the user is on vacation or at a particular project site.

The data captured using the queries, forms, and automatic settings can constitute metadata that can be used to selectively process or display other types of data. Thus, if a user indicates that they are at location XYZ a week, that metadata may become associated with the local data generated by the user during the relevant one-week period at that location. Although GPS location may be able to give the address of the location or derive the building address and store that as metadata, indicating that the user was working in room 202 at location XYZ may require input on the part of the user. Also, if a user is on vacation, this is something that needs to be inputted into the system in order to become metadata that can be associated with data captured or otherwise generated using the mobile device.

The client application 13 can be written in various programming languages such as objective-C or Java. The client application can also be implemented on a mobile device using standard Borne shell scripts. According to one embodiment, a shell script is a program interpreted and executed by a shell, or other interpreter. However, any suitable programming language can be used to design a client application that performs as outlined herein.

From the mobile device's and client application's perspective, the device 12 selects the peer group 18 and ensures that portions of local data 22 combine as a final product that forms a single archive or other data structure of all change sets in that particular device. This resultant transmission of local data 22 to an application server 20 may occur through different pathways or streams of data sent through a group of peers 18. The archive is consolidated at a remote location, such as an archive of processing server 20. In one embodiment, active consolidation of portions of local data at a remote location occurs within a peer group 18 through a series of data flows or streams using a connectionless protocol.

The processing application 21 can be any suitable software application that receives, processes, converts, archives, or otherwise interacts with data, such as local data 22 or a portion thereof, originating from the mobile device 12. Alternatively, the processing application 21 can be any suitable software application that generates processed local data 24 such as a copy of local data 24.

Before describing the flow of information in greater detail with respect to the elements depicted in the overall system 10, one skilled in the art should recognize that although a device network, mobile communication device, a group of processing elements, and an application server are all shown as separate and distinct from the Internet 16 all of the elements shown in FIG. 1 can all be linked by or exist within the Internet 16 or any suitable subset thereof or other type of network without deviating from the scope and spirit of the invention.

The client application 13 installed on the mobile communication device 12 includes modules and routines to accomplish several novel objectives. The first objective is monitoring changes on the mobile devices 12. The second objective is to transmit data associated with a change in the data content of the mobile device 12. The application monitors data changes to detect anything that is changing in that mobile device environment. For example, these changes can involve contacts, events, insertions, deletions, modifications, calls made, calls received, text messages sent, text messages received, notes and other content changes, voice memos, voicemail that is stored as local data on the mobile device, GPS tag data, photos, and other different modalities of user-generated content that can occur on a handset.

Since the second function of the mobile device is to offload data, there is a temporal period in which the client application begins accumulating one or more change sets such that when client application or related service can make a valid connection, the client application or related service can start pushing such one or more change sets to processing element, such as an SMS server or an application server.

The client application can process: memos, voicemails, pictures, text messages, and other file types. The application streams a subset of local data and archives it offline such that they can be accessed through a browser, a proprietary application, a web server or other suitable device or software component in one embodiment.

Returning to FIG. 1, a mobile communication device 12 is shown. This device can be any suitable communication device now known or otherwise developed in the future, such as a smart phone, personal digital assistant (PDA), cellular telephone, media player, and laptop. In general, in a preferred embodiment, the device 12 includes a processing element, a storage element such as a hard drive or flash memory, a transmitter, and other suitable hardware and software as appropriate to transmit or otherwise stream data from the device to a remote location, a peer, or other remote processing element.

Typically, the mobile device 12 includes an input device. This input is responsive to a user action. The device also includes a storage element. The storage element is sized to store local data 22. Local data can include any data element stored on, captured by, or otherwise accessible in the device. Examples of local data include, but are not limited to pictures, media files, emails, text messages, voicemails, memos, notes, and logs.

A client application 13, such as a transmission application, is stored within the storage element. The client application is designed to transmit at least a portion of local data 22, a media file to a remote location such as the application server 20. A processor is also part of the mobile device 12. The processor is programmed to detect changes in any local data, such as media files stored in the storage element and initialize the transmission application in response to a user action. The user action may include a preset signal to automatically archive all data on the devices or a specific command by a user to transmit the local data to the remote application server for handling by the processing application. The mobile device 12 also includes a transmitter in electronic communication with the processor and the storage.

Figure 2A:
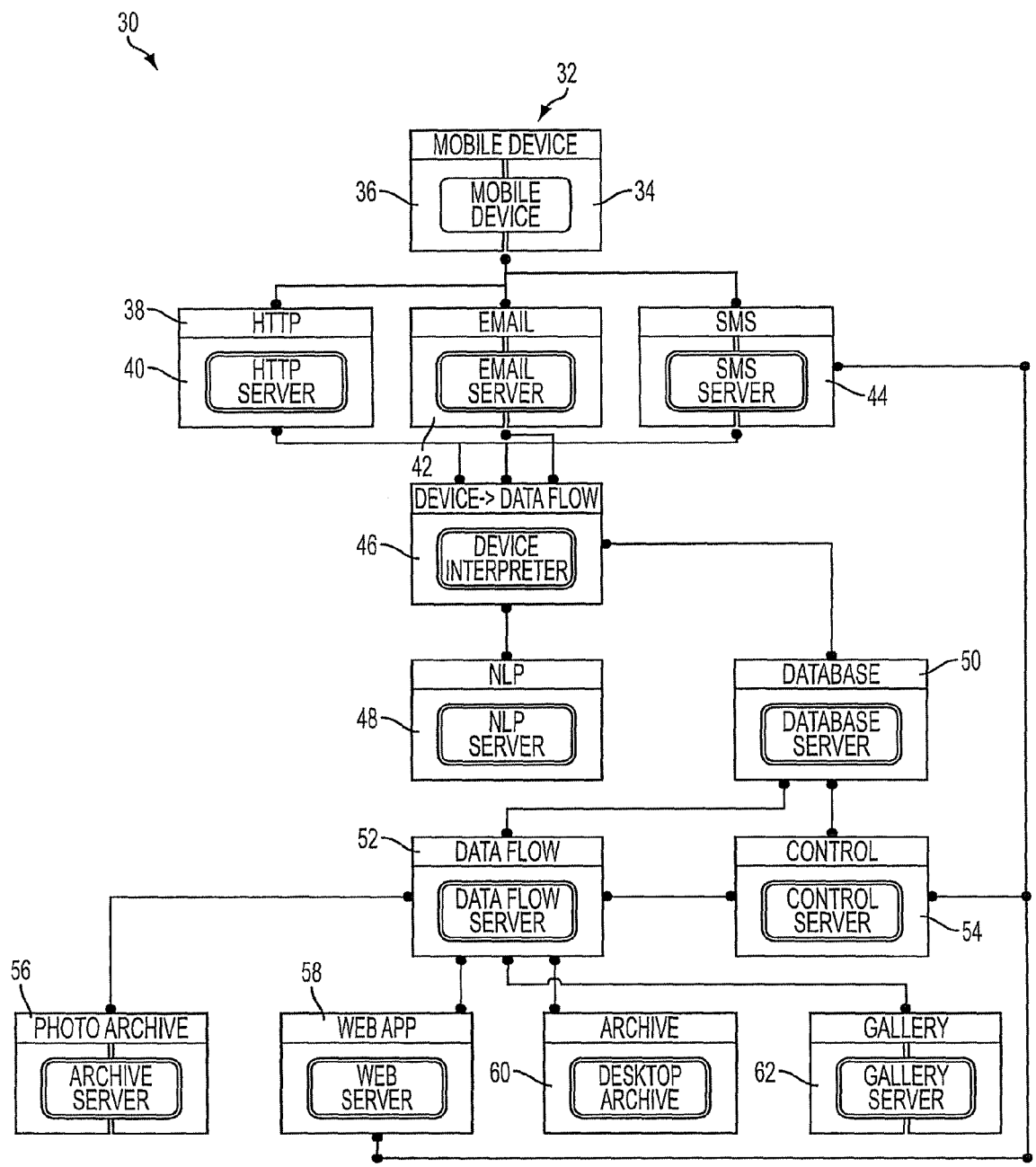
FIG. 2A is a diagram illustrating a network-based system suitable for implementing an embodiment of the invention.

FIG. 2A illustrates a system 30 that includes a plurality of devices, servers, software components, and communication elements suitable for transmitting, routing, and processing local data from a mobile device such that it arrives at a remote location. This system provides additional detail relative to the system 10 illustrated in FIG. 1.

As shown in FIG. 2A, a mobile device 32 includes a client application such as the client application 13 discussed above with respect to FIG. 1. The client application resident on the mobile device 32 may include a particular application programming interface (API) 34 that communicates and performs certain functions relative to software and/or hardware components 36 that are specific to the mobile device 32. In contrast, certain peers depicted in FIG. 2A such as HTTP server 38 are configured such that the underlying software 40 running on the server is exclusively under the control of the service offering that is paired with the client application.

Thus, certain peers may be exclusively controlled by a service offering that works with the client application, such as remote photo archiving service; certain peers may be independent of any service offering and simply route information from the client application; or a combination of both of these options such that some components of the peer are controlled by the service offering while others are not.

As discussed above the mobile device 32 captures or receives various types of content such as visual voicemail, pictures, notes, SMS sent/received, a call log, emails, and various other types of local data that change based on the activities and subscriptions of the mobile device user. The local data also includes meta-data and version information associated with each of the foregoing files and any other files that can be stored on or generated using the mobile device. In order to transmit, process, and route local data, such as data streams and change sets from the mobile device 32, the device 32 communicates with various processing elements or peers as shown in FIG. 2A.

Specifically, as shown in FIG. 2A, the mobile device 32 initially communicates with one of an HTTP server 38, an email server 42, or an SMS server 44. The role of the HTTP server 38 is to send HTTP messages and receive HTTP messages which are forwarded to other servers or devices as shown in the figure. The HTTP server is present to support different firewall constraints as needed for some embodiments. The email server 42 sends and receives email messages. Finally, the SMS server 44 sends SMS messages and receives SMS messages. Each of the HTTP server 38, email server 42, and SMS server 44 all communicate and pass data through a device interpreter 46.

In one embodiment, a device interpreter 46 is used because the underlying data sent from the mobile device 32, such as, but not limited to emails, HTTP messages, and/or SMS messages, may vary based on the type of mobile device being used and the configuration of the client application. Thus, a phone may transmit change set data differently than an mp3 player.

As a result, a device interpreter 46 is used to receive, understand, and translate or convert the relevant data, such as change sets and other content. Thus, different types of data that originate from a mobile device can be interpreted on a device by device basis. Thus, data streams that originate from a mobile device can be standardized using an interpreter 46. In one embodiment, the protocols at issue are device-specific. Accordingly, an interpreter or interpreter module would be installed on a server for each class of devices. Once the relevant data from the mobile device has been interpreted, depending on the type of data at issue, in one embodiment the data will continue to the natural language processing server 48, the database server 50 or both.

The natural language processing (NLP) server 48 performs services for translating basic natural language commands and queries into a data flow or data stream. As an example, the client application can act as a remote control using a text messaging modality. Thus, instead of logging into a browser and remotely accessing a service, such as an online photo archive, a user of the mobile device can instead simply send a message that is routed from the client application to the NLP server 48.

Once received by the NLP server 48, the server processes the text message and sends out a signal to accomplish an objective. With respect to the photo archive example, the signal may be to turn "off" the receive feature of a user's photo archive account such that photos are not automatically archived until another text message (or other user input) is sent to turn the particular account feature back "on" so that it can receive data (photos created as local data) from the mobile device 32. In addition to the NLP server 48, the group of peers can also include a data repository in the form of a database server 50.

The database server 50 can store copies of or processed versions of any type of local data generated on the mobile device 32. The database 50 also includes software that grants access to various different file stores and databases that are used by the peers that work in conjunction with the client application. Thus, if a photo archive service or voicemail archive service is being offered, the client application sends out the data, and the database server acts as a remote location where a copy of the data is stored. For example, the database archive can function as the archive of all the change sets associated with one or more mobile devices. In one embodiment, the database is a mySQL database. In turn, the database server 50 is in communication with a data flow server 52 and a control server 54.

The data flow (or data stream) server 52 provides services for translating basic mobile device changes sets into basic a data flow or data stream which will be customized in response to input from the control server 54. As discussed above, multiple data streams, such as change sets, are created using a mobile device with a client application. Services for insuring all strands are processed, audited, logged and/or archived are provided by the control server 54. The customization and regulation processes that oversee and control the service offerings, such as photo archiving, paired with the client application are performed by the control server 54. For example, the control server 54 may access the database server 50 to identify which mobile device users subscribe to different client application based services in order to control which functionalities are made available to those users.

The last tier of peers shown in FIG. 2A includes an archive server 56, a web server 58, a desktop archive 60 and a gallery server 62. The archive server 56 provides services to upload pictures to a third party picture archive. The web server 58 provides services to upload content to an application suitable for arranging files and activities in time, such as an event calendaring application, such as the interface shown in FIG. 4C. In part, this is facilitated by the integration of time stamp data in the local data that is sent or received. The integration of time stamp data, typically within the meta-data, in a given file allows for tracking of the events associated with the generation of local data and the local data itself.

The desktop archive 60 provides services to upload content to personal desktops such as sending photo repositories to a home computer, set top cable box, or other user controlled electronic devices. Finally, the gallery server 62 provides services to upload pictures to third party gallery web-based photo album. In one embodiment, the gallery server automatically prepares a printed photo album based on a selection of photo transmitted from a user's mobile device 32.

Figure 2B:
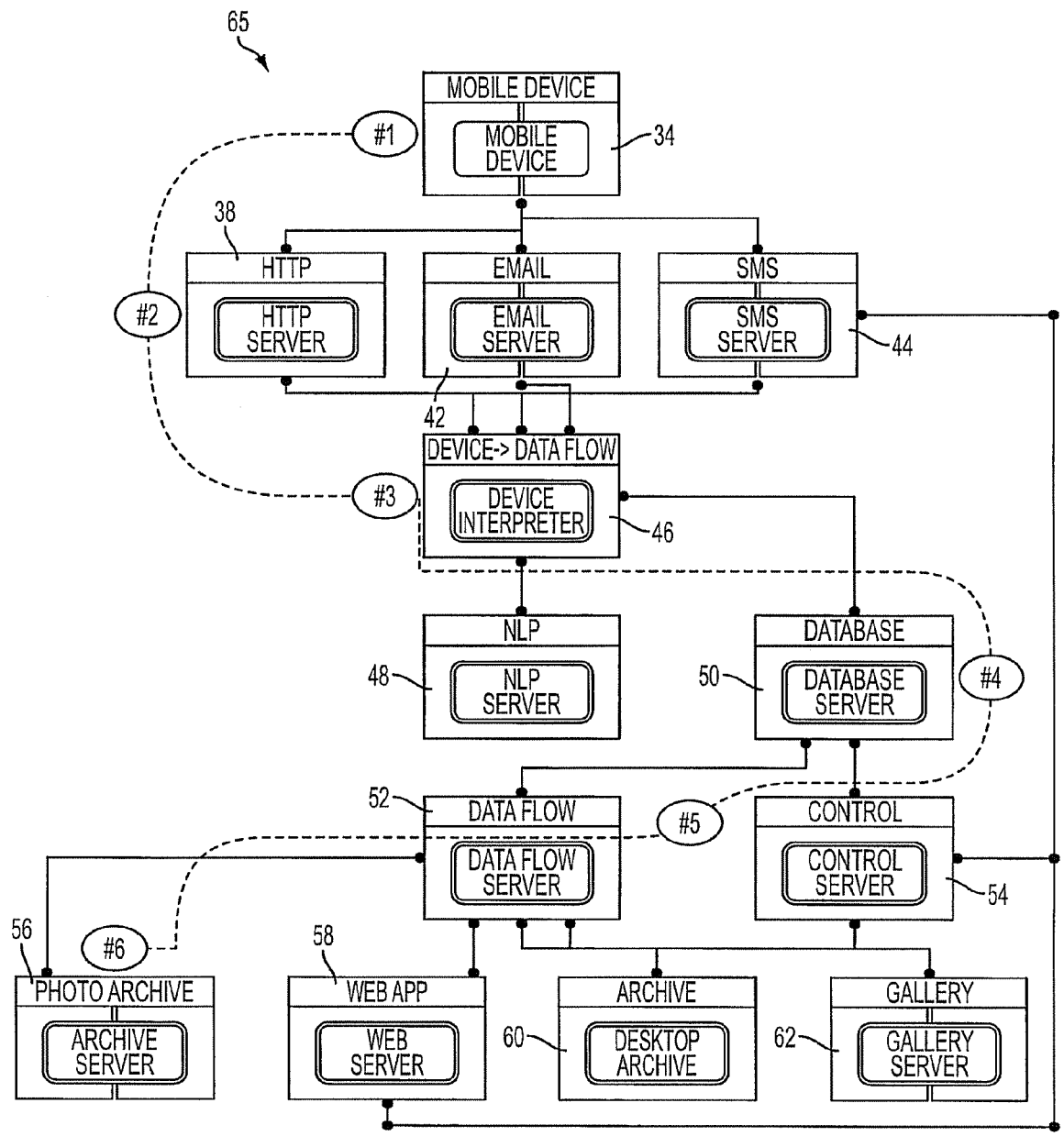
FIG. 2B is a diagram illustrating a specific flow of information with respect to the system of FIG. 2A according to an embodiment of the invention.

FIG. 2B shows the sequence of steps (steps #1-#6) associated with archiving pictures generated on the mobile device at a remote location according to one embodiment. As shown, in step #1, initially the client application transmits local data that includes one or more photos to an HTTP server 38 where the local data is received in step #2. Next, in step #3, data flows, in the form of a stream or other suitable configuration from the HTTP server to a device interpreter 46. As shown in the figure, the underlying data associated with the local photo data is stored in the database in step #4. In step #5, the data flow server 52 routes the local photo data based on routing information provided by the client application. Specifically, the local data is routed as a data stream that feeds into an online photo archive hosted on the archive server 56 where it is stored pursuant to step #6.

Figure 3:
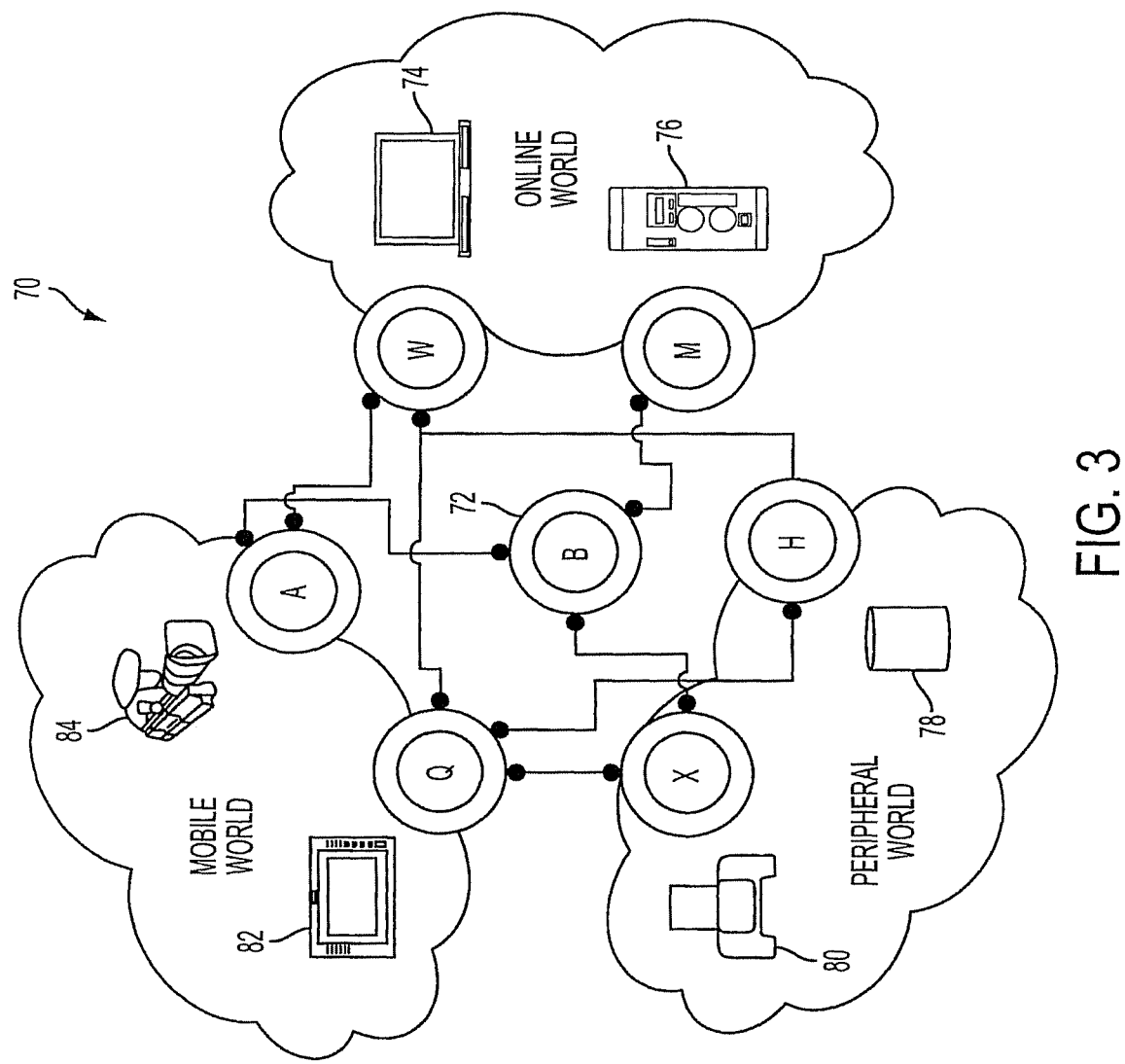
FIG. 3 is a diagram illustrating a collection of peers or processing elements suitable for exchanging data according to an embodiment of the invention.

FIG. 3 shows a collection of processing elements or peers 70, linked by nodes A, Q, X, H, M, W and B, to which a mobile device 72 can communicate and receive and transmit data. Specifically, a laptop 74, desktop computer 76, a data storage element 78, a printer 80, a PDA 82, and a video camera 84, as well as other devices not shown, can all serve as peer devices suitable for receiving data and commands from the mobile device 72. As shown, local data can be archived, processed or transmitted to any number of peer devices. The peer based processing and data exchange between the devices shown in FIG. 3 allow data to be continuously or periodically processed. Further, data back-up can be performed in the background such that it is invisible to the use of the device. All contacts, logs of calls placed and received, messages, email, SMS, images, video, MMS, tasks, notes, files or other content stored on mobile device can be transmitted through the nodes shown to various peer devices as applicable.

In one embodiment, FIG. 3 shows a peer system. Thus, a peer system is composed of a topology of remote peers capable of processing remotely generated SMS or other message-related change set archives and remote devices capable of generating such sets, in one embodiment.

FIGS. 4A-4J are screenshots depicting a user interface that can be made available to a user through a browser, a mobile live, or as a standalone application. The interface provides a user with various options, controls, and data filters that they can use when accessing a remote application that contains a processed or archived version of the local data that was transmitted from their mobile device to a remote application. In one embodiment, the user interface is implemented using a Wiki based approach.

Figure 4A:
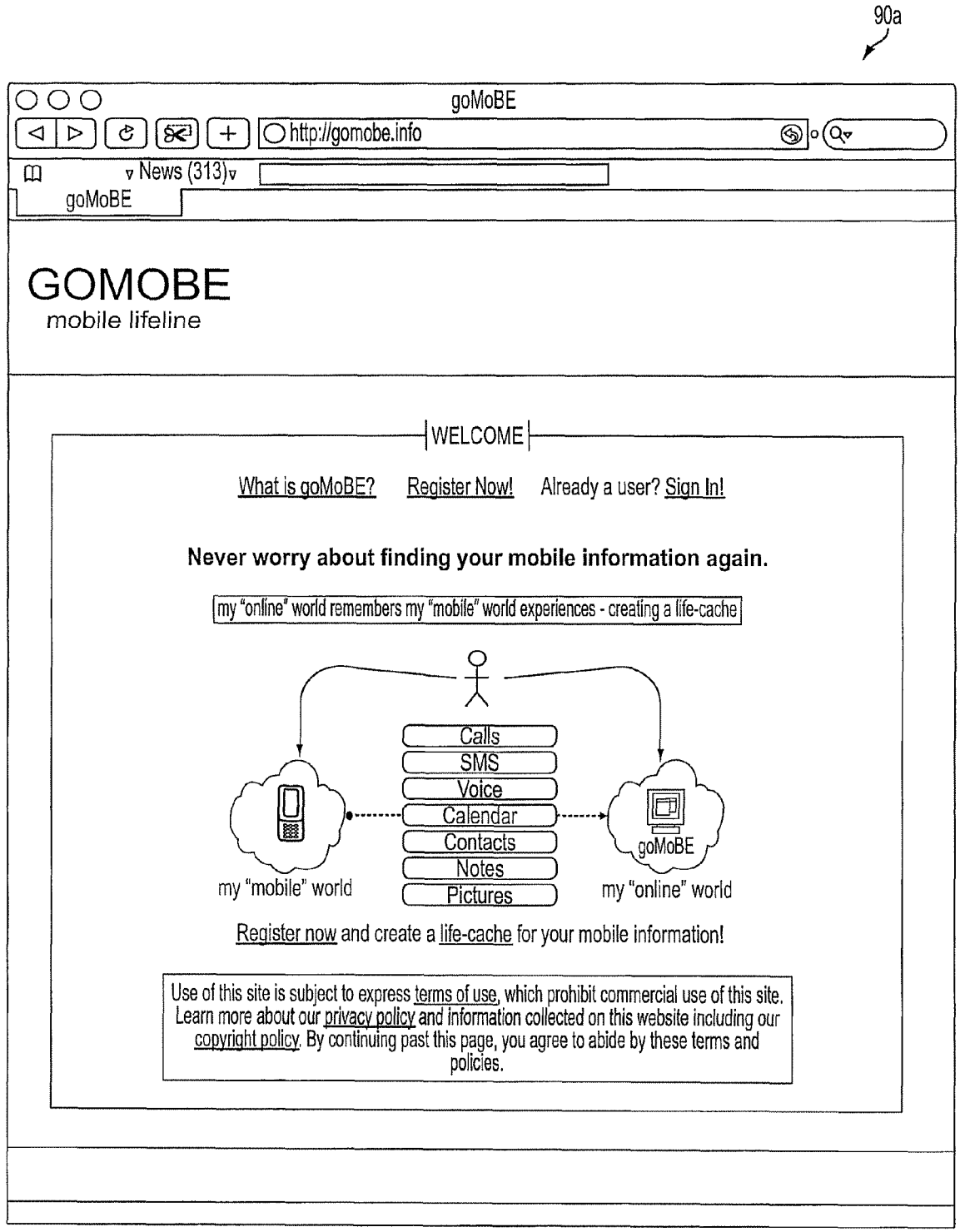
FIGS. 4A-4J are screenshots illustrating different features of a user interface suitable for providing access to data according to an embodiment of the invention.
Figure 4B:
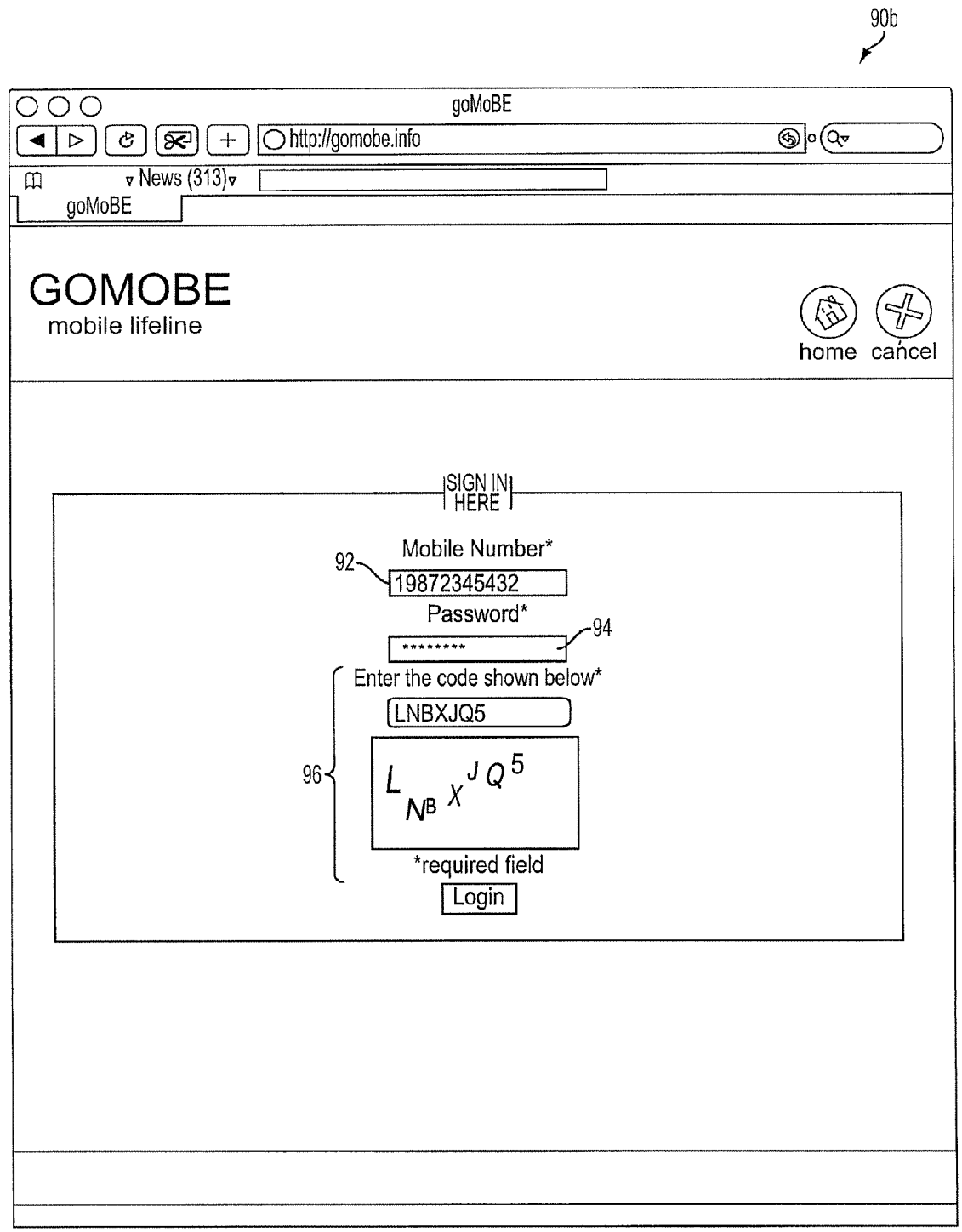

In FIG. 4A, a screenshot 90a of a user interface of a home screen is illustrated. Similarly, in FIG. 4B, a screenshot 90b of a user interface of a login screen is illustrated. In one embodiment the login interface requires the input of an account identifier 92, such as a mobile number, a password 94 and a unique code 96 randomly generated to prevent automated scripting and web robots from improperly accessing the system.

Figures 1, 4C:
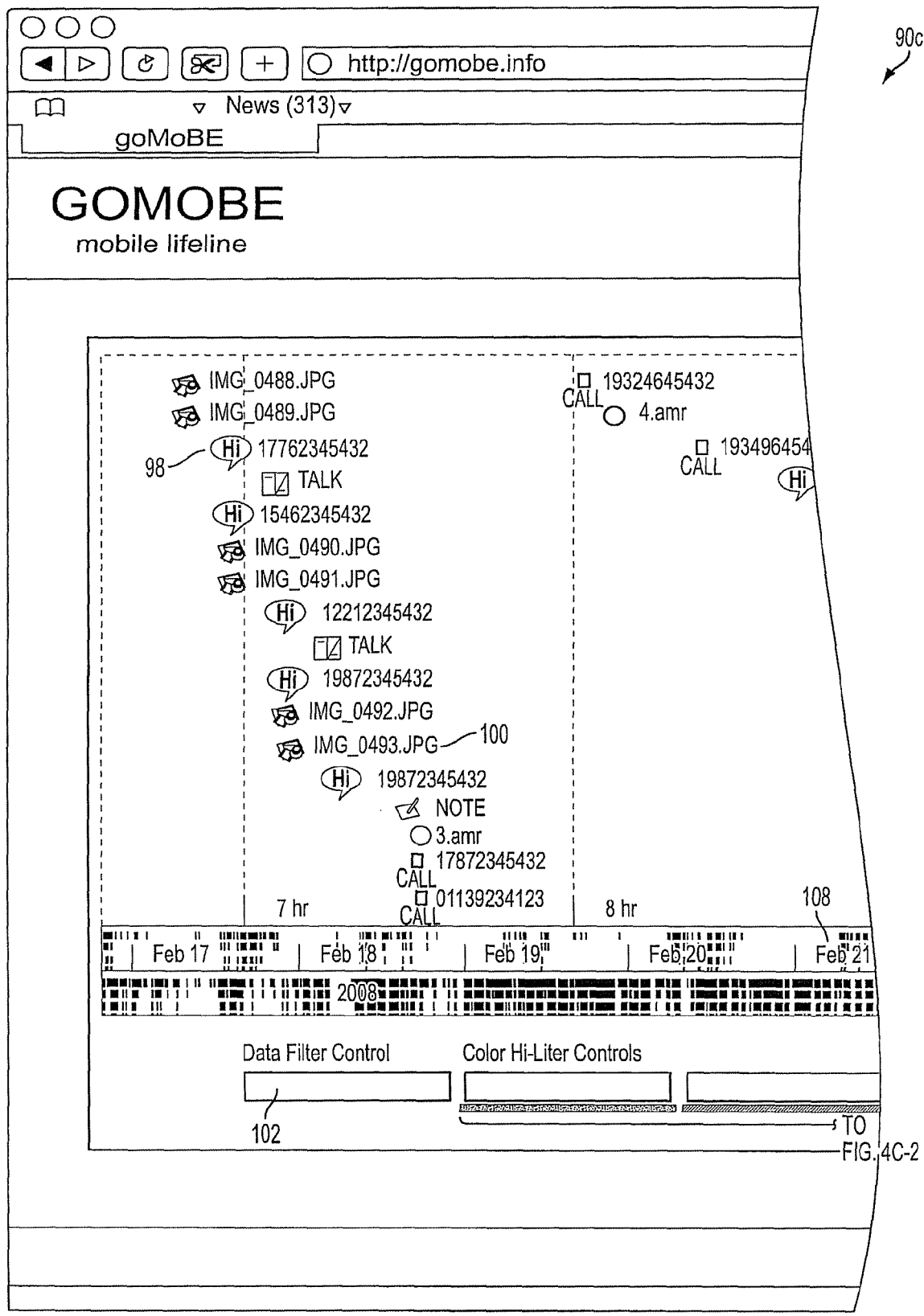
Figures 2, 4C:
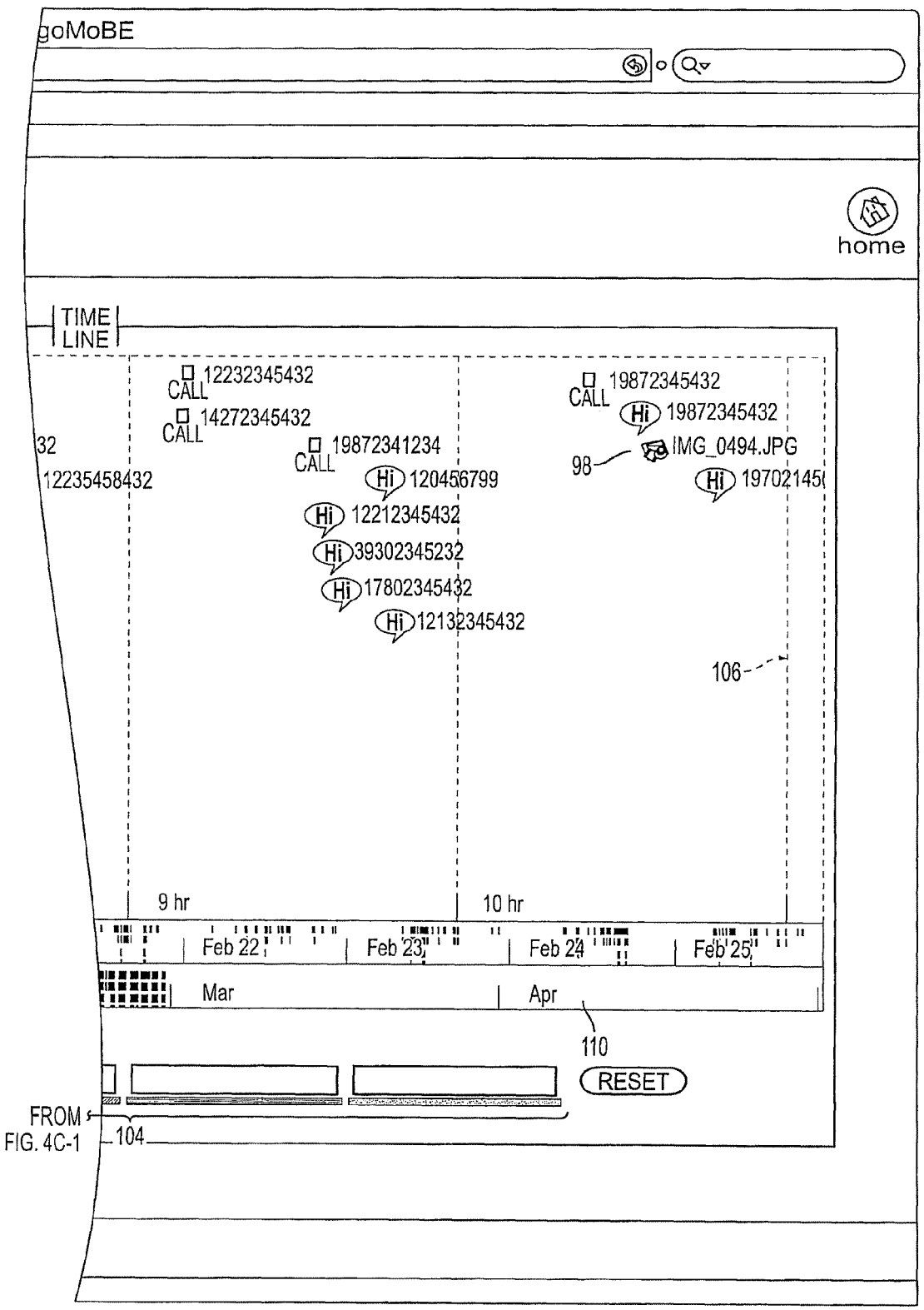

In FIG. 4C, a screenshot 90c of a user interface that displays various types of archived content and files 100. Specifically, as shown in the screenshot 90c, call logs, digital photos, voicemail messages, and other versions of local data generated using mobile device are shown. Each type of media content stored may be represented by an icon identifier 98 indicating which type of content the archive is (i.e., a voice conversation, text or instant messaging conversation, digital image, etc.) Filter 102 and highlight controls 104 allow a user to apply a selection criteria to the archive data to retrieve and display only the content desired. The color highlight controls 104 may present the entered keywords found in distinct colors facilitating the viewing of desired content. The content may be arranged in a time line fashion that allows a user to scroll through the archived content by hour 106, day 108 or month 110.

Figures 1, 4D:
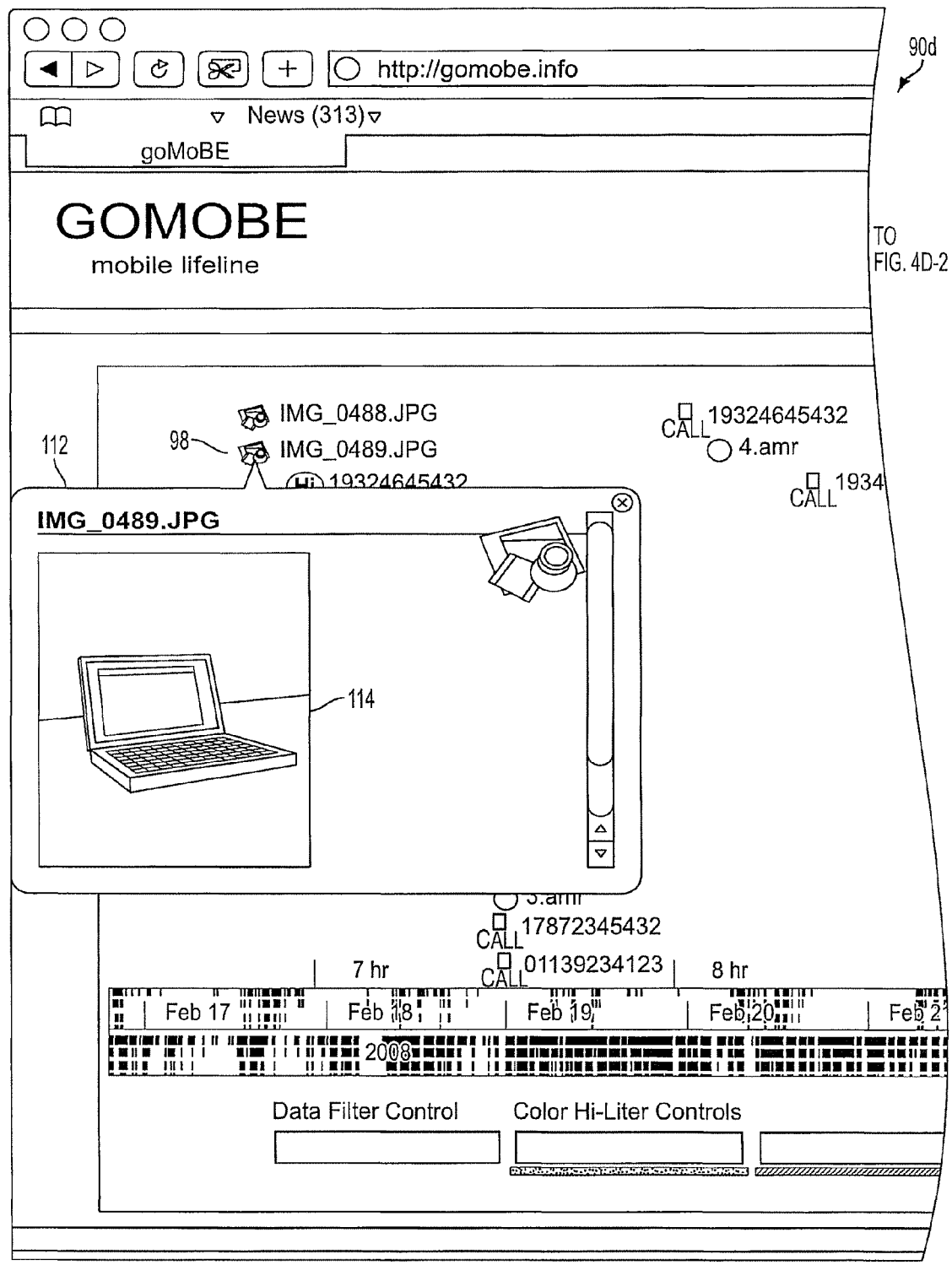
Figures 2, 4D:
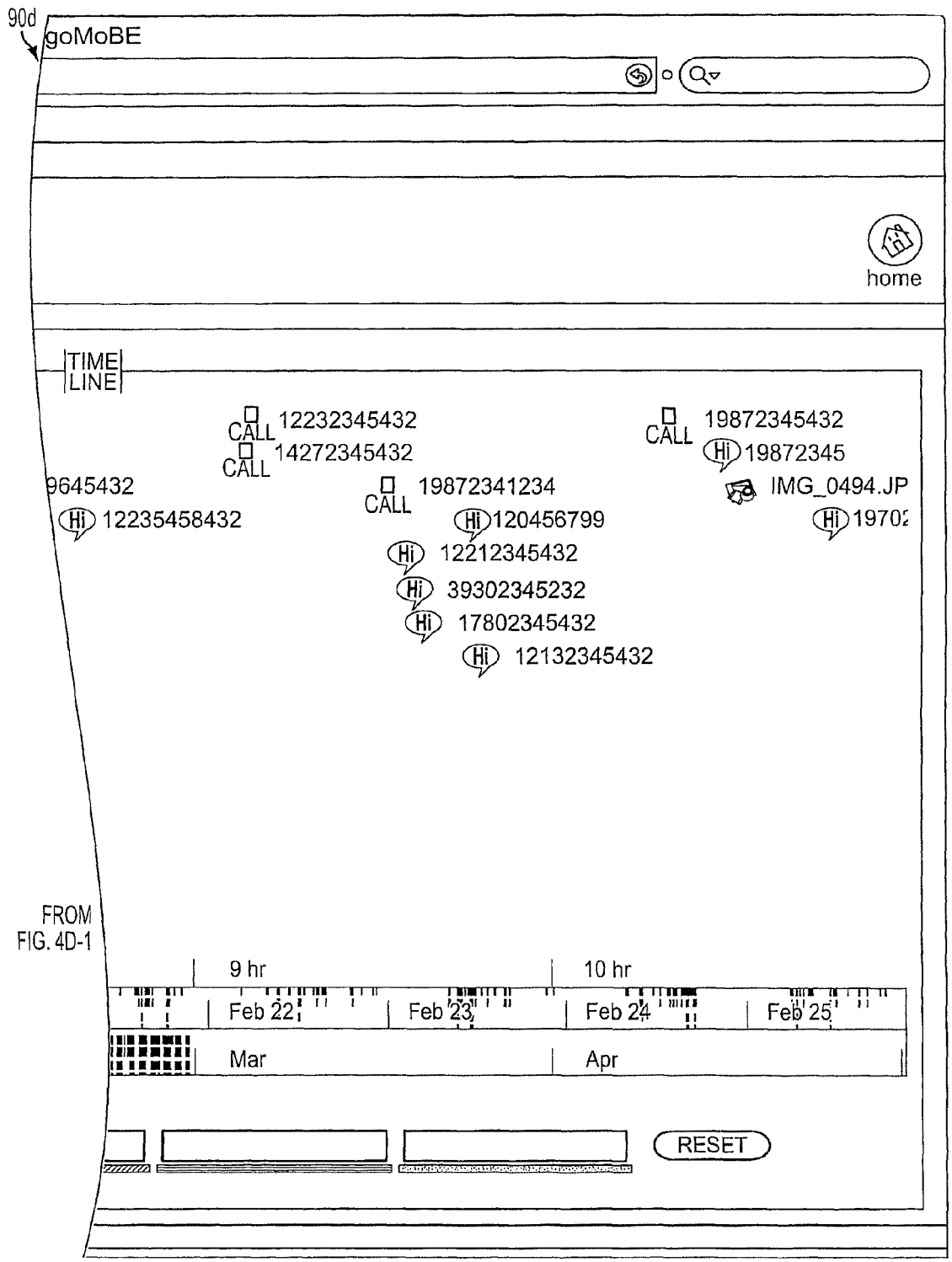
Figures 1, 4E:
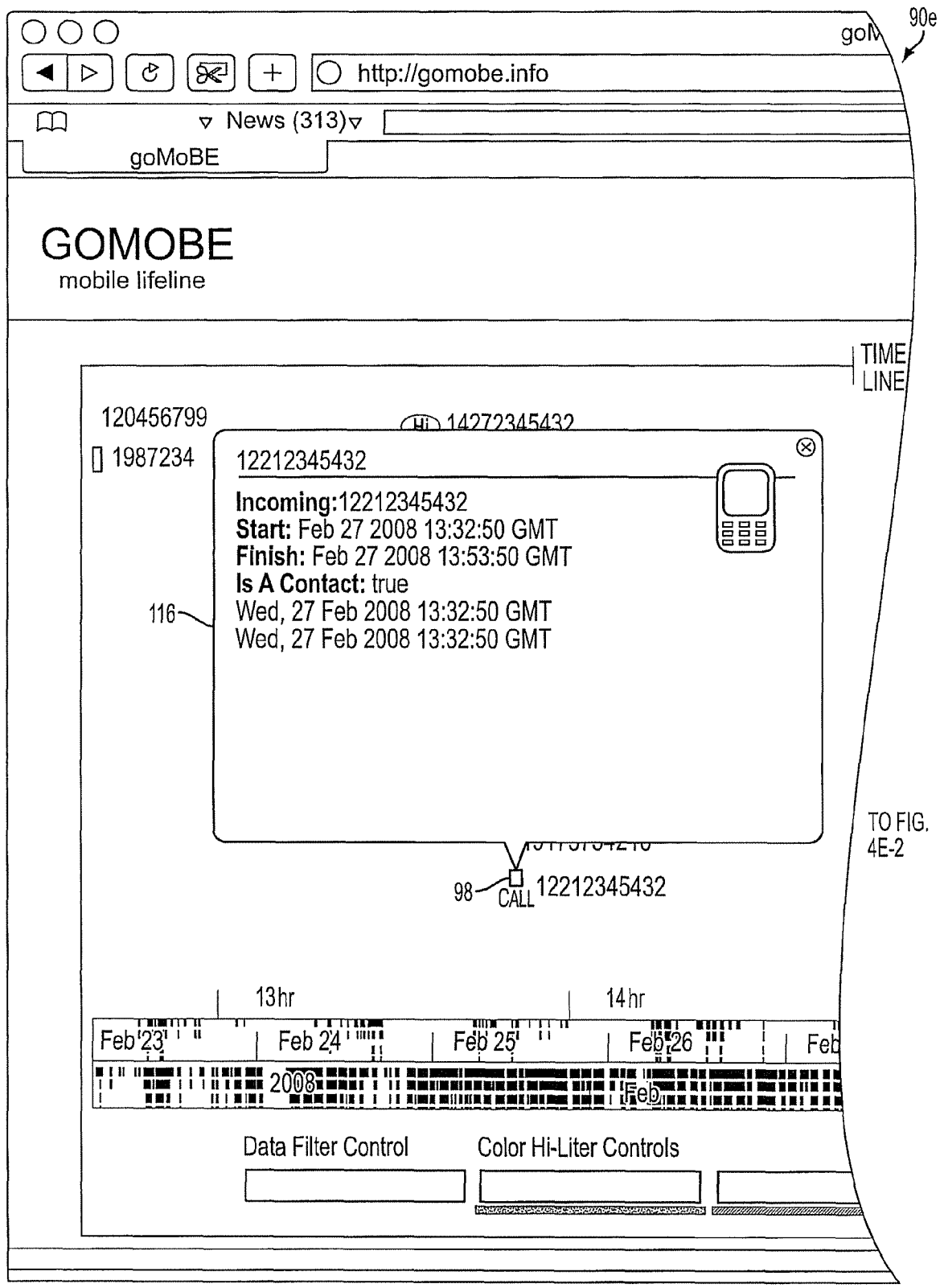
Figures 2, 4E:
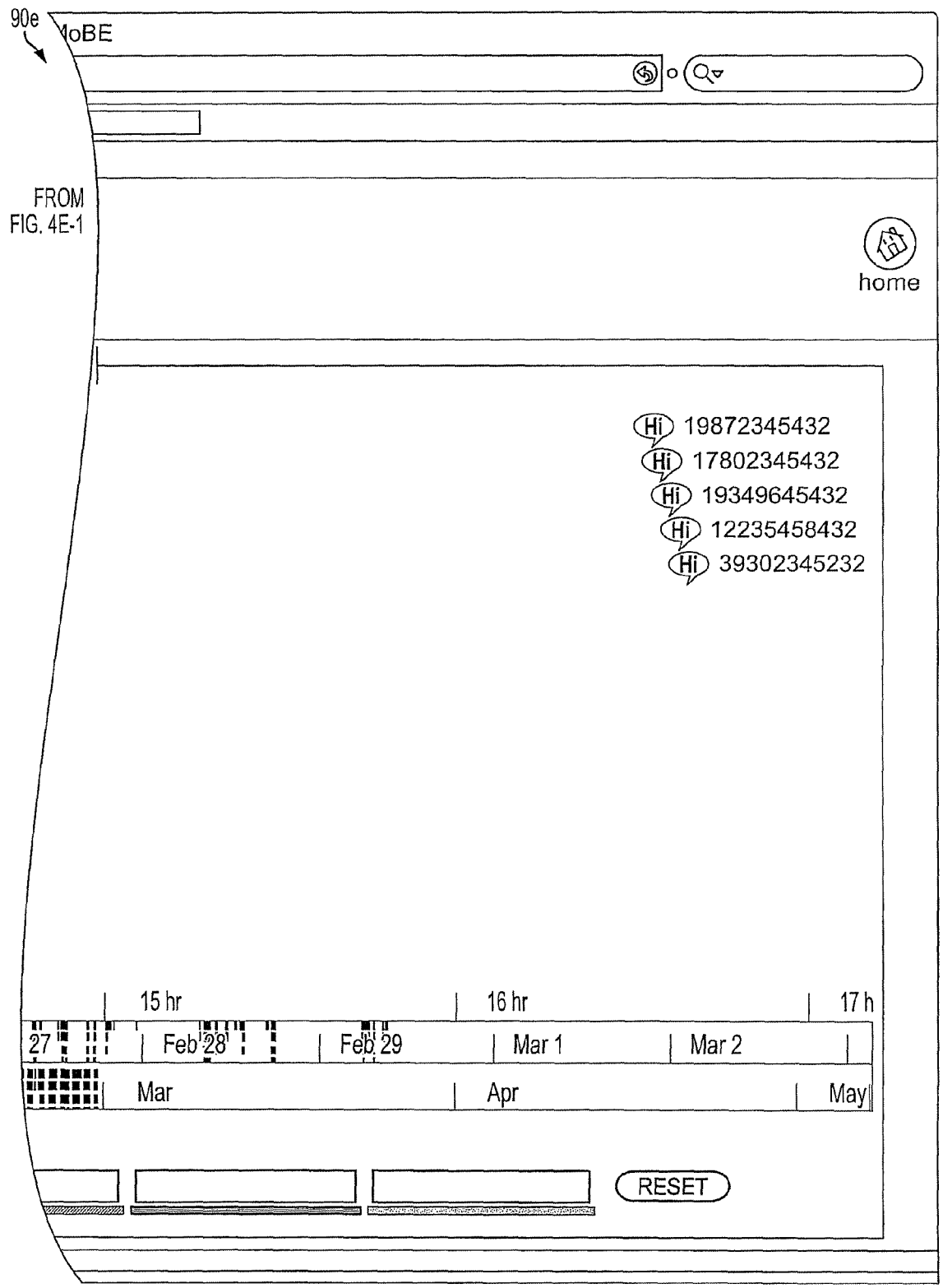

In FIG. 4D, a screenshot 90d of a user interface showing a digital photo being accessed using the interface is illustrated. Selecting an image icon 98 initiates a pop-up bubble displaying a thumbnail image of the selected file. Clicking on the thumbnail image itself will open up the full image file in its original size. Similarly, in FIG. 4E, a screenshot 90e of a user interface that shows a call log record being accessed is illustrated. Clicking on the call log icon 98 initiates a pop-up bubble 116 displaying call log info from the record selected.

Figures 1, 4F:
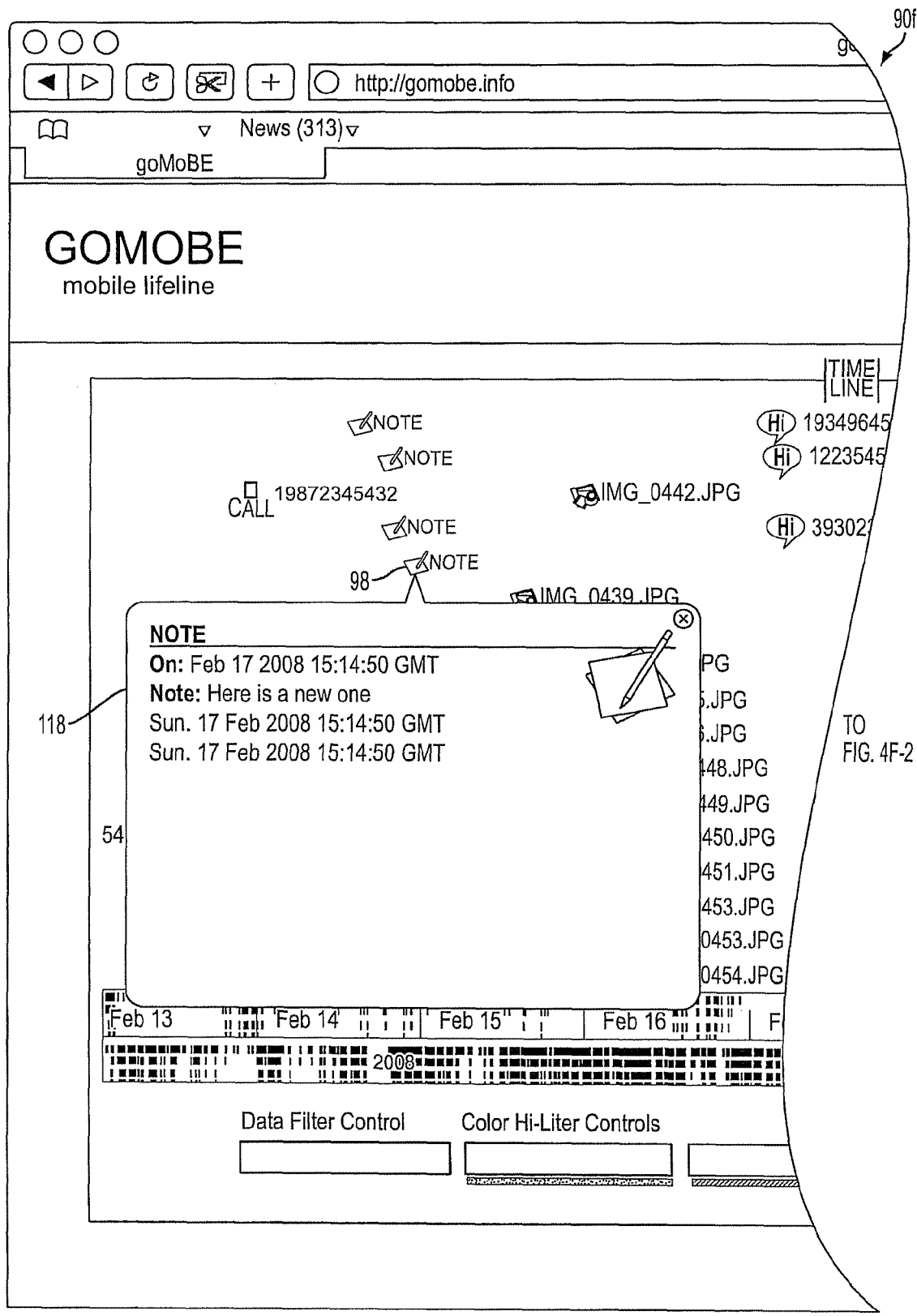
Figures 2, 4F:
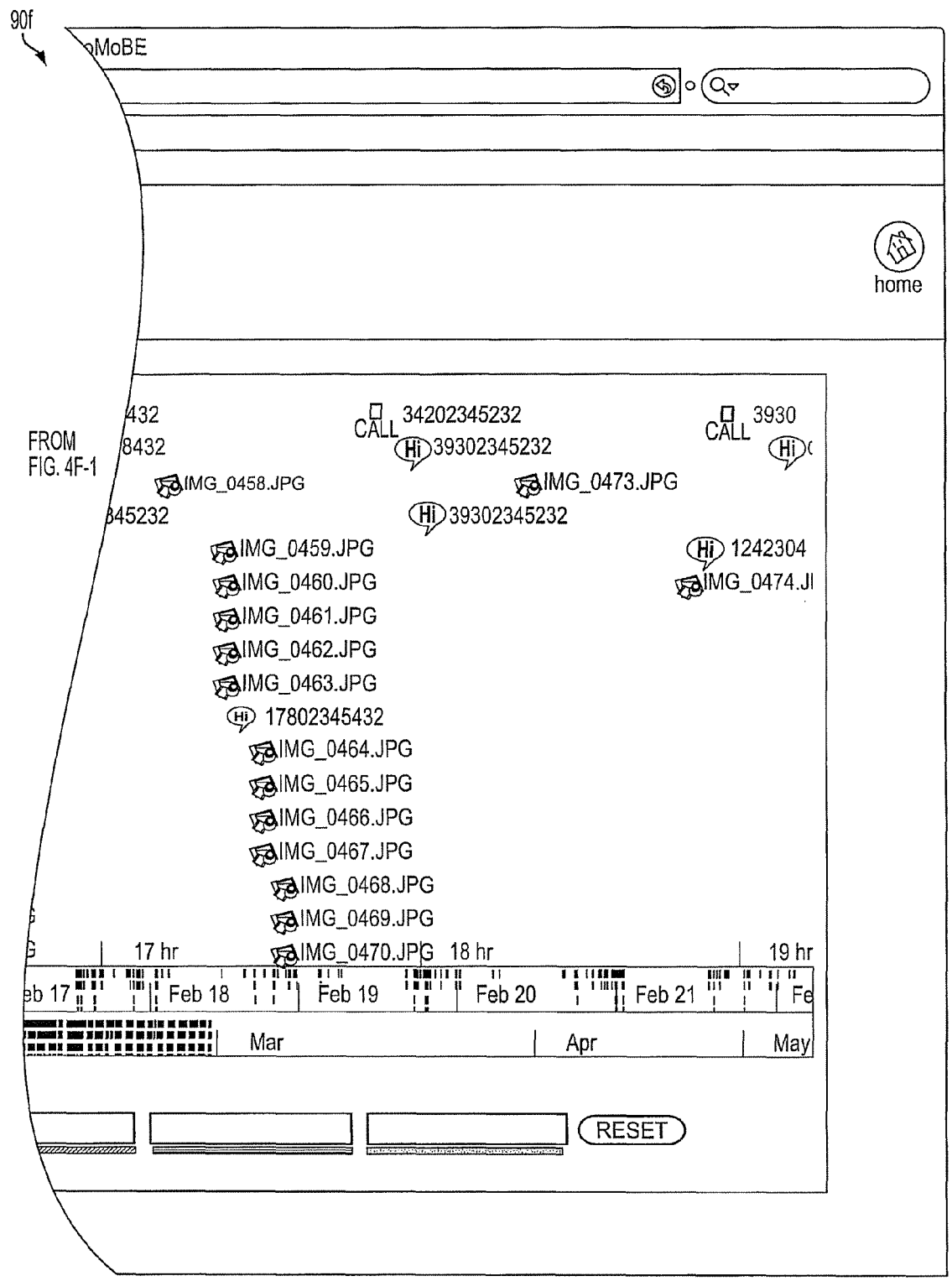
Figures 1, 4G:
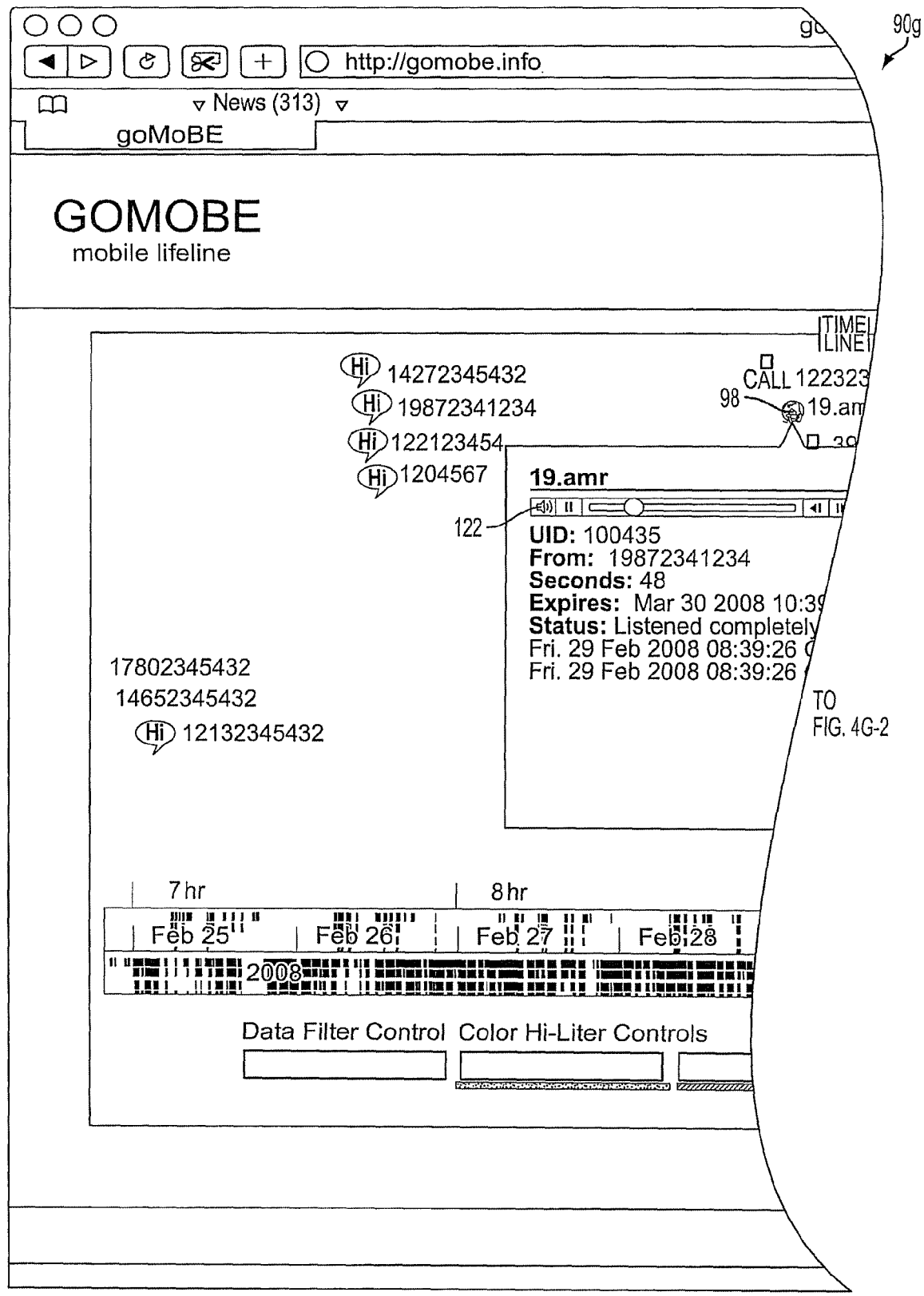
Figures 2, 4G:
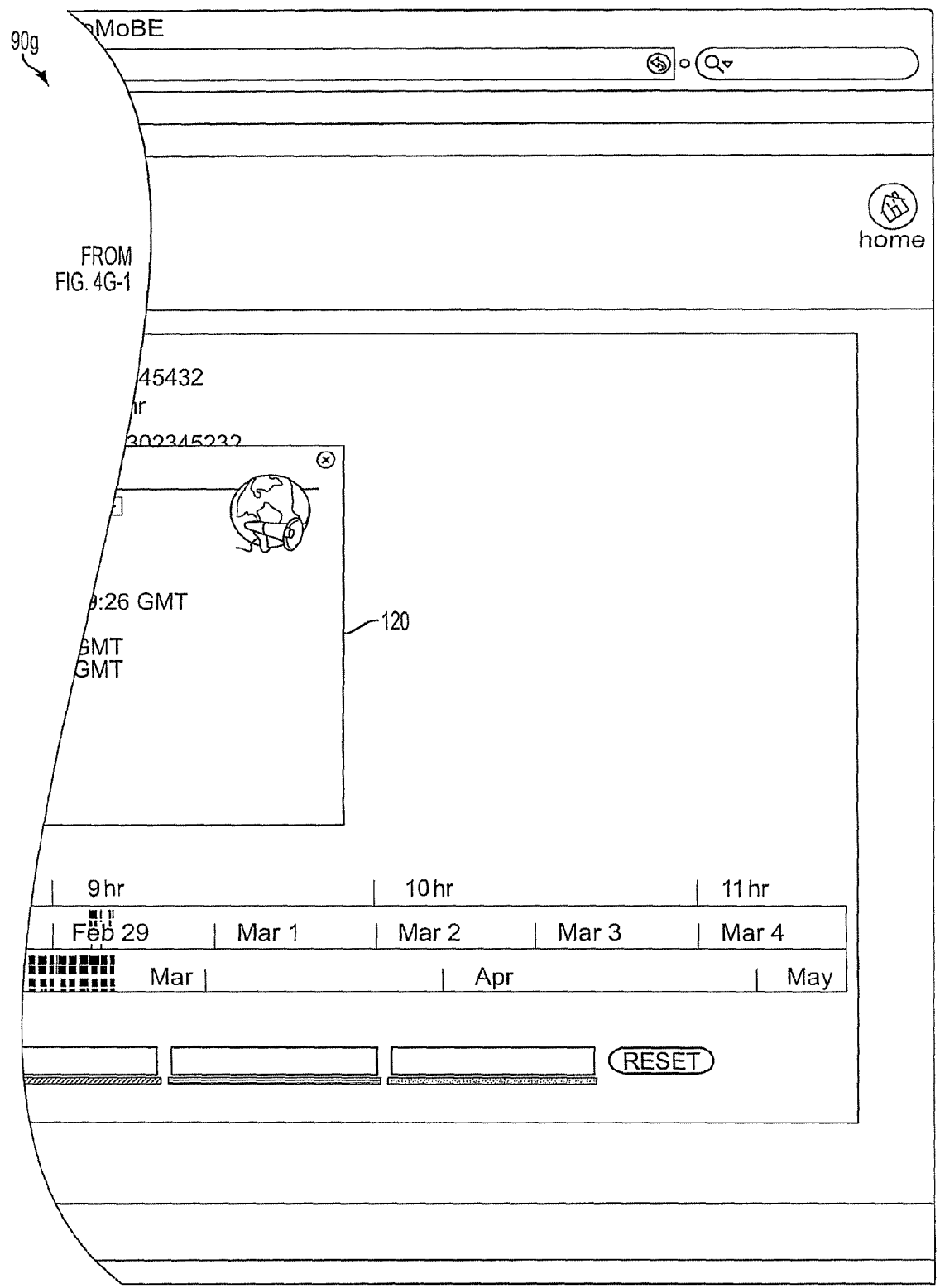

In FIG. 4F, a screenshot 90f of a user interface is illustrated showing the selection of a Note record. Clicking on the Note icon 98 initiates a pop-up bubble 118 displaying the contents of the Note record selected. The displayed contents may also include metadata or other data showing time and date of creation, last viewing, last edit, etc. In FIG. 4G, a screenshot 90g of a user interface is illustrated showing the selection of a voicemail record. Clicking on the voicemail icon 98 initiates a pop-up bubble 120 displaying voicemail log info from the record selected.

In turn, play controls 122 are displayed with-in the bubble 120 allowing the user to play, pause and control the volume of the playback of the voicemail record. In one embodiment, selection of the voicemail icon automatically initiates the playback of the record. Metadata and other data about the voicemail record may also be displayed, such as call time, length, data, and status messages regarding the playback of the message (e.g., unheard, new, old, previously started, listened completely, etc.).

Figures 1, 4H:
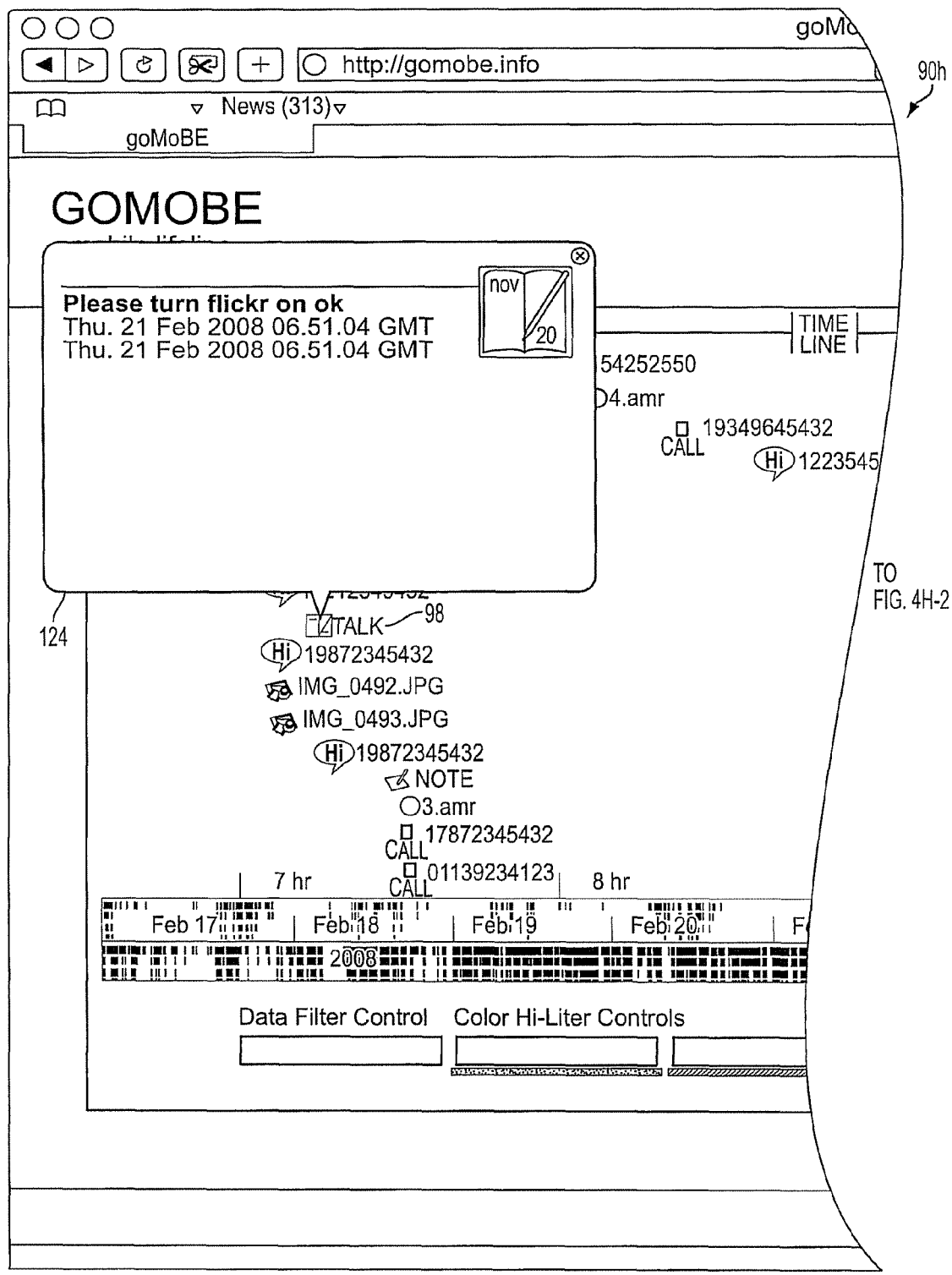
Figures 2, 4H:
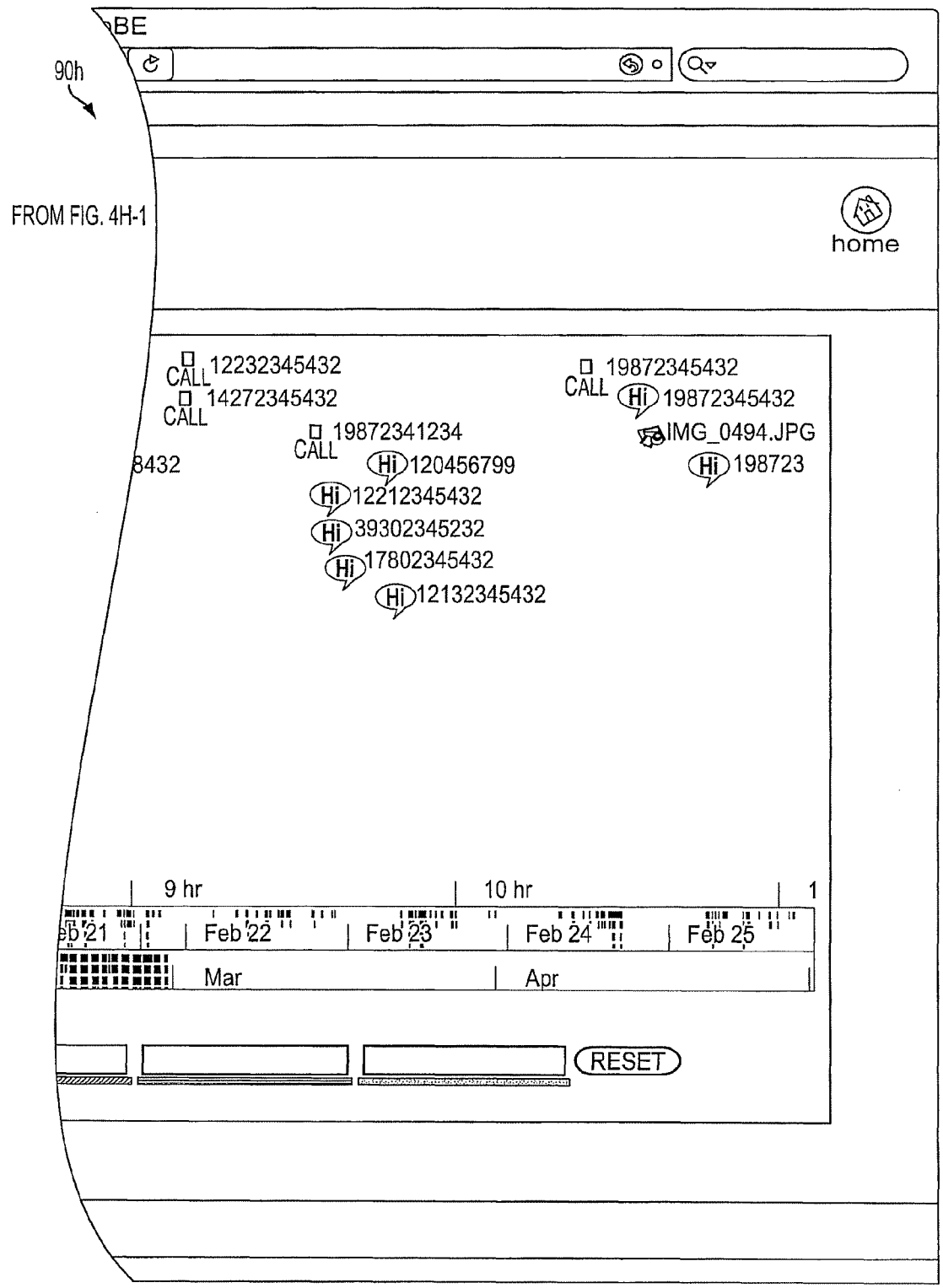

In FIG. 4H, a screenshot 90h of a user interface is illustrated showing accessing a talk record that includes SMS based instructions to turn a Flickr account "on." Clicking on the talk log icon 98 initiates a pop-up bubble 124 displaying call log info from the record selected. The contents of the bubble 124 display the text of SMS messages sent to the relevant control peer. The ability to turn features "on" or "off" can be extended to any type of programmable interaction. Thus, out of the office or on vacation auto-reply messages can be controlled remotely using various commands, such as text message with appropriately formatted instructions.

Figures 1, 4I:
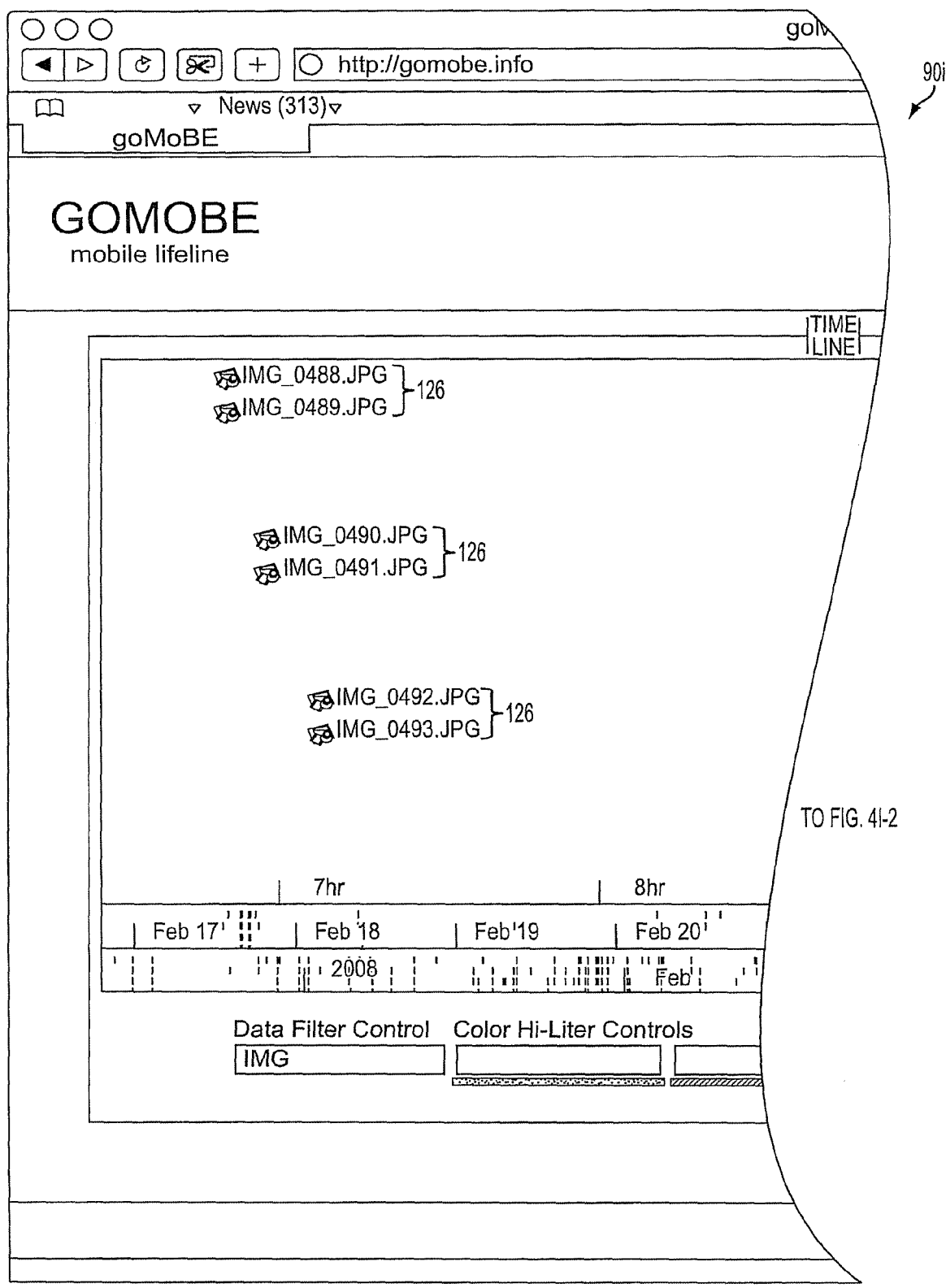
Figures 2, 4I:
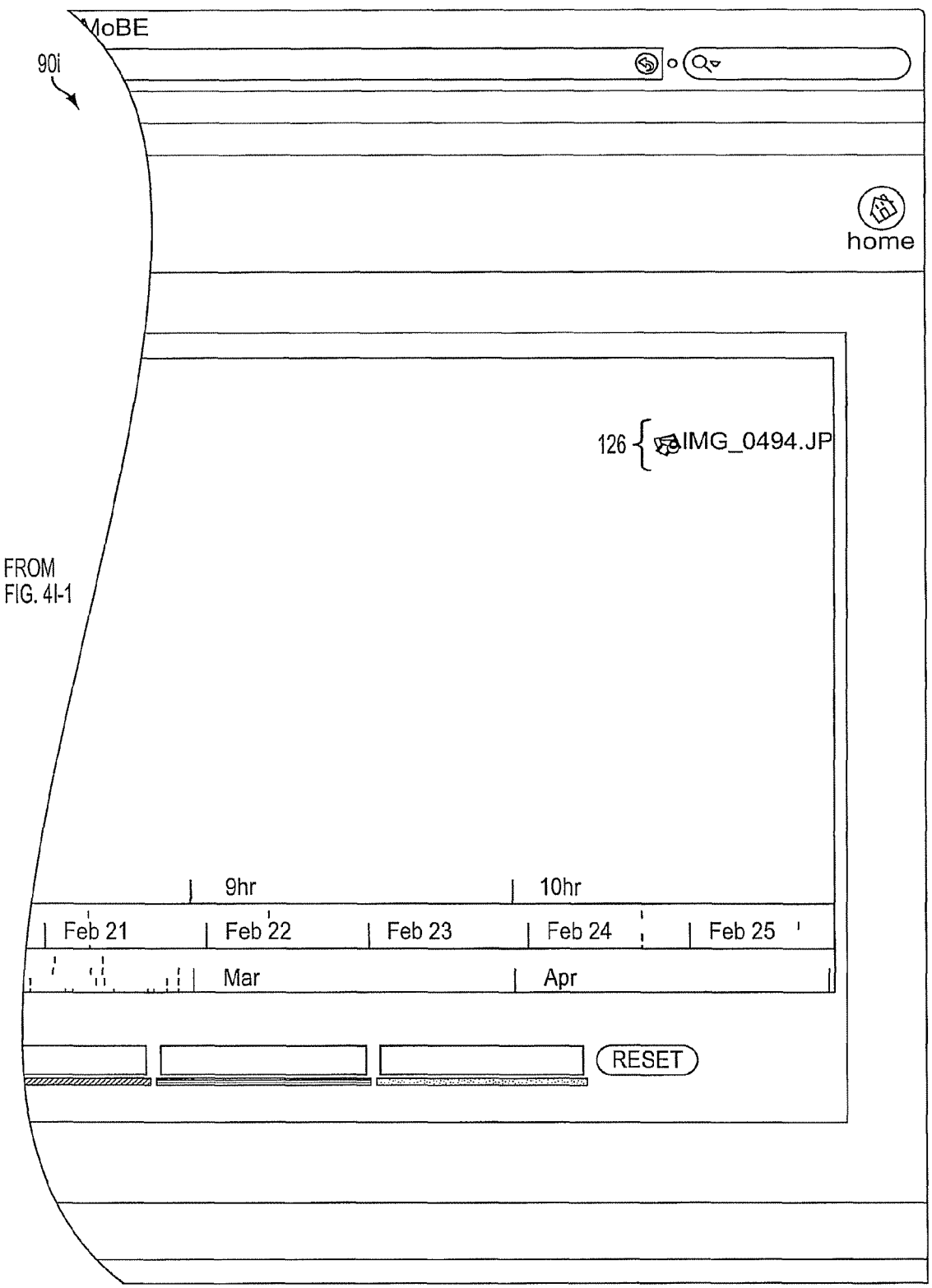

In FIG. 4I, a screenshot 90i of a user interface is illustrated after applying the data filter controls 102 to display only records containing the keyword "IMG" for image files. After applying the filter, only the "IMG" records 126 are displayed in their locations in the time line chronology.

Although various chronography-based embodiments are suitable for representing metadata in the form of spatial data, chronology is not the only possible representation for spatial metadata. For example, a calendar representation can be used; pictures generated using the device can be grouped under seasonal headings (Spring, Summer, Fall, and Winter); or a project-specific representation can be used. With respect to the project-specific representation, these can be used by an insurance adjuster, a bidder, a purchaser for a store, law enforcement personnel, or other individuals using their mobile device to capture data based on the techniques shown herein. Thus, the methods and system can represent data in any suitable format advantageous for individual jobs and projects. In addition, since other types of metadata discussed throughout (local data; device-generated data; user-generated or inputted data; and various types of derived data) may benefit from being plotted, sorted, or otherwise represented to the user, the interface and display applications for representing local data and processed versions thereof are infinitely customizable. This customizability can be a function of context, metadata type, local data at issue, user preference, or the other data relevant parameters discussed herein.

Figures 1, 4J:
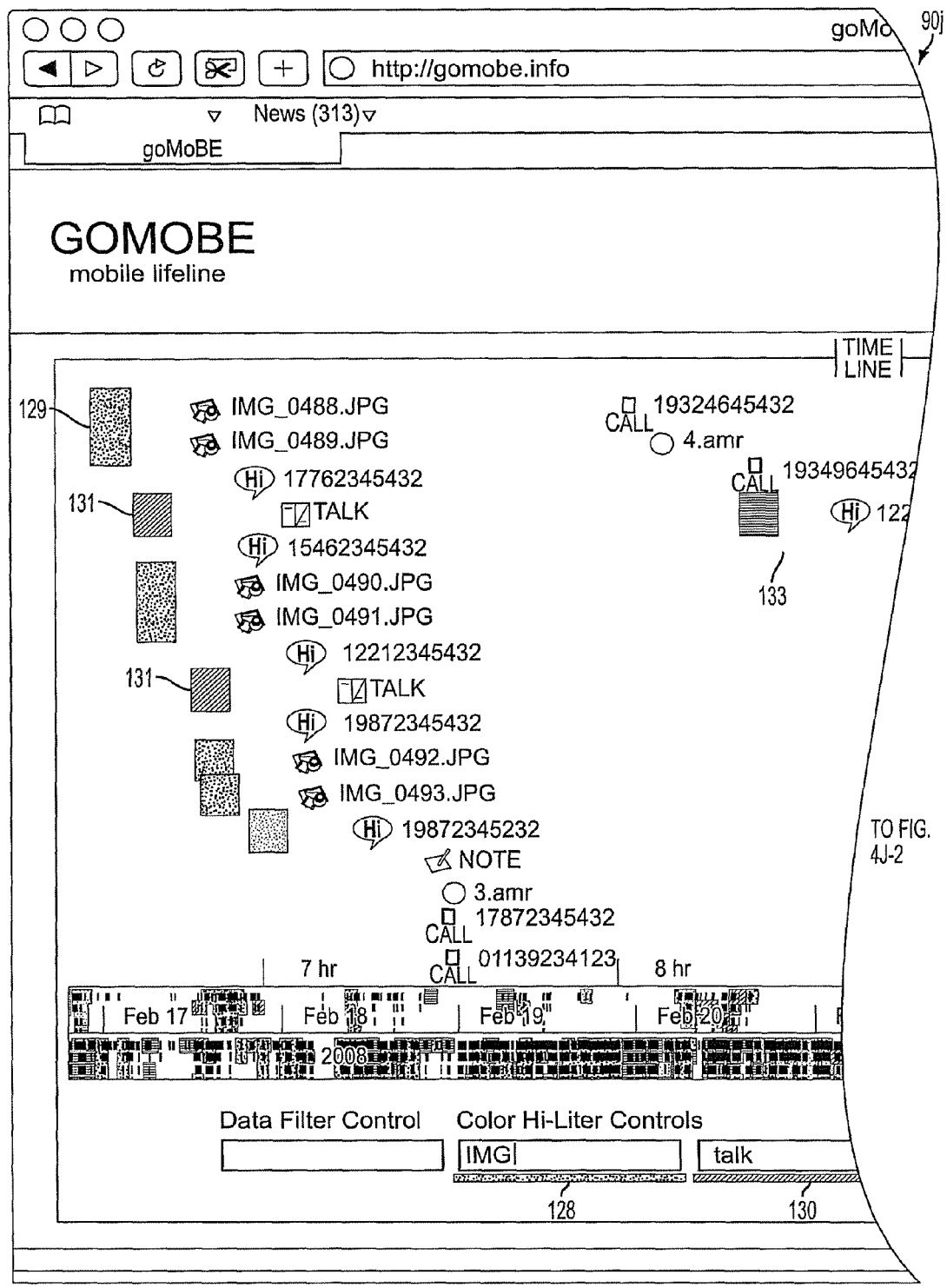
Figures 2, 4J:
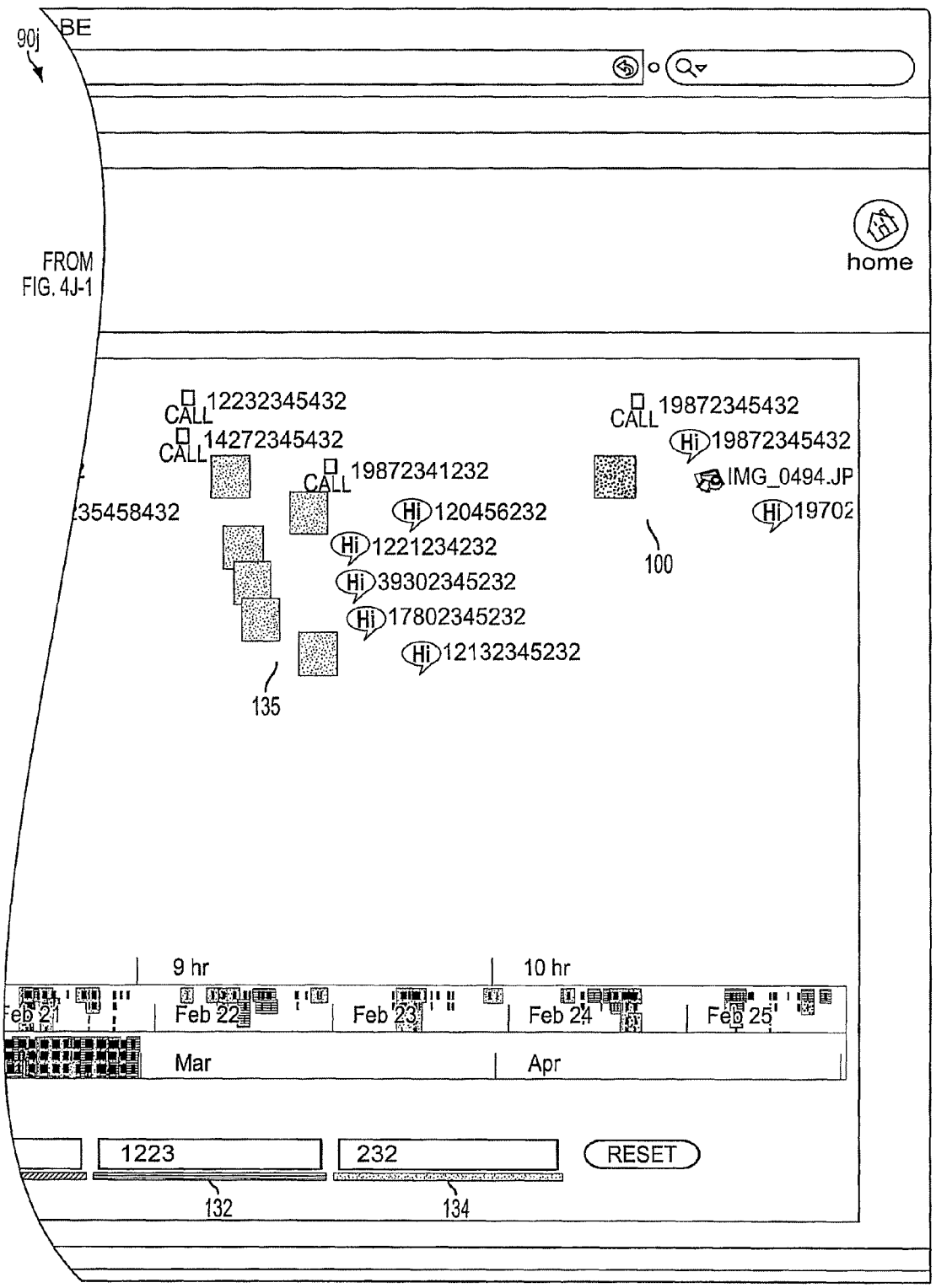

In FIG. 4J, a screenshot 90j of a user interface is illustrated after applying the color highlight controls 104 to the archive. In the illustrative example, the keyword "IMG" is entered in the first highlight control dialog box 128. The icons for records containing the keyword "IMG" are displayed in a first color 129. The keyword "talk" is entered in the second highlight control box 130 resulting in the "talk" records being highlighted in a second color 131. The keyword "1223" is entered in the third highlight control box 132 resulting in the records containing the keyword being highlighted in a third color 133. The keyword "232" is entered in the forth highlight control box 134 resulting in the records containing the keyword being highlighted in a forth color 135.

Many free and pay-per-use online photo galleries exist that allow a user to share photos with others. One example of such an archive is the popular "Flickr" service. In one embodiment, the application client automatically transmits photos captured by or otherwise generated using the mobile device to a user's photo gallery account with the online archive provider. In another embodiment, a user or a friend of the user may utilize a digital video recorder or cable set top box that serves as the remote location and application server to which a version of local data, such as pictures and videos can be sent. In addition to archiving photos to an online photo gallery or repository, the client also allows users to push, pull or otherwise stream data to other users of the service.

As noted above, the ability to send mobile device-generated (or received) data through a collection of peers for remote processing can be extended to various different applications. Specifically, as discussed in more detail below with respect to FIGS. 5A-6B, a messaging specific system (FIGS. 5A-5B), a metadata-based time and location tracking system (e.g., one suitable for implementing a child protection service) (FIGS. 6A-6B), and a related third party monitoring method (FIG. 7) can be implemented using some of the components discussed above and below.

Figure 5A:
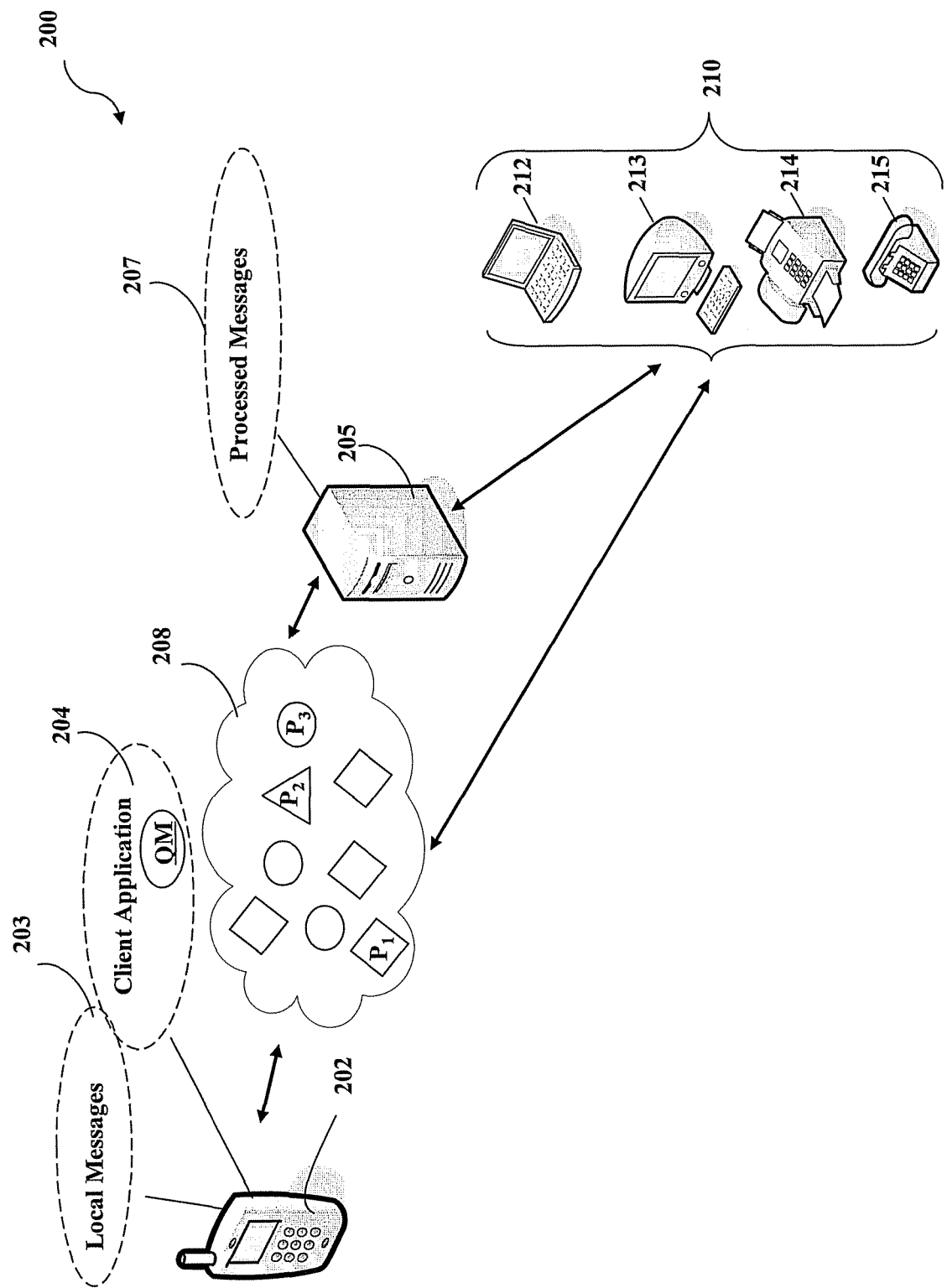
FIG. 5A is a diagram illustrating a peer to peer based system suitable for implementing a message processing embodiment of the invention.

Initially, with respect to these additional embodiments, the message processing embodiment is described relative to FIG. 5A. Specifically, an exemplary network based system 200 for implementing a message processing embodiment of the invention is illustrated in FIG. 5A. In a preferred embodiment, messages refers to text messages such as, but not limited to SMS messages or instant messages (IM). However, with respect to the message processing embodiments depicted in FIG. 5A and in FIG. 5B, messages can include, but are not limited to text messages, emails, electronic document files, instant messages, PDFs, and any other suitable human or machine readable character containing electronic media files.

As shown in FIG. 5A, an exemplary peer to peer message processing system 200 is shown. In one embodiment, message processing includes, but is not limited to message archiving, performing text to speech conversion with respect to text messages, transmitting and storing metadata associated with messages, enabling message archive searching using a remote peer, and translating and processing messages such that they can be relayed between different mobile devices in a manner that is substantially transparent to the end user.

Returning to FIG. 5A, a mobile communication device 202 (alternatively, a first peer) is shown that includes a software application, such as the client application or a peer-to-peer based application, 204 suitable for performing many of the transmission, data streaming, user querying, and switching functions described in more detail above with respect to local messages 203. The application 204 is suitable for interacting with, transmitting information to and receiving information from a message processing server 205 (alternatively, a second peer) or message archive 205 as shown in the figure. The peer-to-peer or client application can also include a query module (QM) suitable for presenting fellable forms and questions to the device user.

At a high level, in one preferred embodiment the mobile device based system 200 can function as a text messaging archive that allows for the archiving or remote processing of sent and received text messages, such as local messages 203, using a mobile device 202. As a result of the remote processing or archiving of one or more local messages 203, one or more processed messages 207 results. This is achieved using the change sets and data streams discussed above. In addition, the associated metadata can be routed to a remote location such as a processing server 205 or message archive 205 to enhance the processing features and options available to a user as discussed below.

In one embodiment, this archiving and/or remote processing can be achieved by routing or selectively processing the local message(s) 203 using various peers $P_1$, $P_2$, and $P_3$, for example, that are connected within or to a network 208 such as, but not limited to the Internet, a WAN, a LAN, or other secured and unsecured networks. In one embodiment, no more than two peers are required and such two pairs can include the mobile device 202 and the message processing server 205.

The messages that originate on or that are received by the mobile device 202, the local messages 203, are processed and routed using one or more peers present in a network 208 such that they are processed or archived using message processing server 205. The processing server 205 or message archive 205 can itself have various modules connected to it directly or resident in its associated memory. Alternatively, the modules (or the processing server 205) can be implemented using one or more remote peers such as $P_1$, $P_2$, and $P_3$.

Figure 5B:
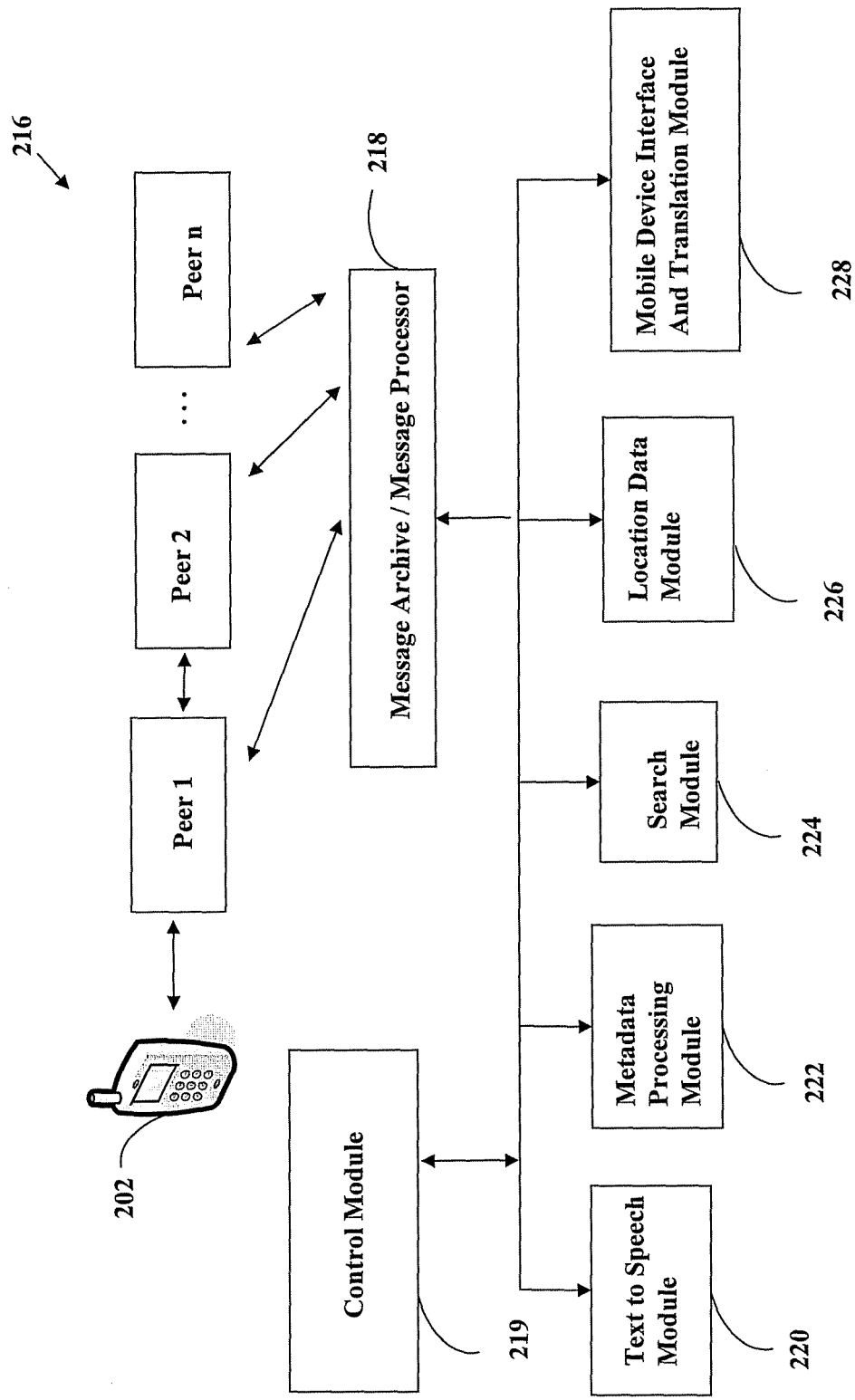
FIG. 5B is a diagram illustrating various data processing modules suitable for use with a peer to peer based message processing embodiment of the invention.

Various examples of suitable processing modules are depicted in FIG. 5B and discussed below in more detail. As used herein a module refers to software, hardware, or firmware suitable for performing a specific data processing or data transmission task. Typically, in a preferred embodiment a module refers to a software routine, program, or other memory resident application suitable for receiving and processing instructions or various types of data with respect to files, change sets, data streams, and other types of mobile device information.

With respect FIG. 5A, in one embodiment, the message processing server 205 is an archive by which the mobile device 202 can selectively access, search, or otherwise interact with the processed messages 207. The message processing server 205 can also communicate and transmit processed messages, metadata associated with the same and other information to various third party peers 210. These third party peers 210 can include devices that are controlled by the user or controlled by other people.

As an example, the third party peers 210 can include, but are not limited to laptops 212, computers 213, fax machines 214, and telephones 215 as shown. However, suitable third party peers 210 that can communicate with and exchange data with the message processing server 205 can also include other mobile devices, PDAs, blackberries, computers, an iPhone, smart phones, web applications, copiers, cable set top boxes, and other digital devices.

As an example, a user of the mobile device 202 can generate or receive a text message and then archive it. Alternatively, the user can access the remotely stored text message (or those on the phone) and have them routed to a fax machine 214 for printing. In addition, the user of the mobile device 202 can access an interface on the mobile device and send one or more text message to a colleague's mobile device. The system 200 (and related system embodiment 216 shown in more detail in FIG. 5B) can include a translation and interface module that allows the device user, such as an iPhone user, to send archived text messages to a colleague's Blackberry (or other mobile devices) in a format suited for the respective device. The systems 200, 216 can also perforin various other functions and value added services with respect to various classes of messages using different modules such as, but not limited to those shown in FIG. 5B.

These additional mobile device initiated operations can themselves be initiated using a message, such as a text message that is processed by an appropriate module, such a control module. This is analogous to the use of a text message to control a web service such as Flickr discussed above. Thus, the user of the mobile device 202 can send a text messages to the archive server 205 that recites "send all text messages with "project" in them to John Smith." The control module would interact with other modules such as a metadata search module and a translation module and interface module and send all of the relevant text messages to John Smith in a format compatible with his mobile device using various peers and other modules as necessary. If problems arise, the control system will query the user via a message.

Prior to considering the exemplary system 216 and related modules depicted in FIG. 5B, it is informative to consider the role of metadata and its relationship with other types of data in various embodiments of the invention. At one level, metadata is data that describes certain underlying data of interest. Both the client application and the processing servers (or peers) described herein can process, store, transmit, enhance, and otherwise use metadata, local data, device-generated data, user-generated or inputted data, and various types of derived data, all of which may be the same as, different from, or overlap with the data type (or types) in some embodiments, in various ways.

Although there may be overlap among the various types of data described herein, it is useful to consider some specific non-limiting examples of the type of data that can be used by different system and method embodiments. Device-generated data can include, but is not limited to data that is generated by a sensor, electronic component, or otherwise modified or processed by the mobile device. Thus, as an example, device-generated data can include, but is not limited to location data, GPS data, longitude, latitude, altitude, signal strength, accelerometer data, barometric pressure, browsing history, altitude data, battery level, time, and other device-generated information.

User-generated or inputted data can include, but is not limited to data that is generated or processed in response to a user action. Thus, as an example, user-generated or inputted data can include, but is not limited to answers to forms or queries, automatic settings (such as in or out of the office settings), keystrokes, user typed characters, user commands, user macros, and other user-generated or input information.

In one specific embodiment, a user can take a global position or other location reading with their mobile device and indicate to the device or a remote peer that the relevant coordinates correspond to their office. Once this initial spatial marker has been set in the system, the mobile device and any remote peers will "know" when the user is out of the office and can generate appropriate metadata reflecting the same.

In turn, derived data includes data that uses other data to generate a result or retrieve information. As a general example, derived data can use a meta tag which cross-references the tag to another database to generate other data of interest to a user. Thus, as an example, device data can include, but is not limited to generating a street address or directions in response to location data, determining weather conditions based on device positional data, generating user identification through their phone number, and types of information that can be derived using data available via the mobile device. In general, all of these types of data, whether derived, user-generated, or device-created are types of metadata relative to particular mobile device event.

Metadata can describe the context, source, the value, the structure or other properties of certain raw data. In one embodiment, a peer-to-peer application on the mobile device or a module on a processing peer associates metadata with each element in a change set such that each element can be linked to and searched with respect to the metadata. This can be used to enable user tracking of activities based on the positional metadata and temporal metadata.

In the case of one embodiment of the invention, useful metadata with respect to which the invention can create, identify, or otherwise process includes, but is not limited to source information, such from where, from whom, and when did a message originate. In the example provided above with respect to text message control and routing the "project" messages to John Smith, metadata is used to conduct the search and to perform other features of that selective searching and routing.

In general, the types of data that the systems and methods of the invention can process and otherwise use (generally "metadata) are infinite. Examples of metadata that can be stored, routed, processed, displayed, and otherwise used by the embodiments disclosed and claimed herein include, but are not limited to user name, change set data, event data, local data, contextual data, spatial data, calendar data, seasonal data, temporal data, user identifiers, IMEI numbers, derived data, GPS data, location data, directional data, sensor data, temperature data, accelerometer data, pressure data, weather data, job specific data, insurance adjuster data, law enforcement data, organizational data, picture data, message data, remote control instructional data, routing data, form captured data, survey data, user modified data, pricing data, and all other types of data that can exist on a mobile device or a remote peer.

As a related example, the system and methods described herein can specify that although a text message was sent from a phone having phone number 1-415-555-5555 whether the sender was in San Francisco, which is the 415 area code, or whether the sender was traveling when in New York. This can be accomplished by using cell tower identification and triangulation as discussed below and various types of stored metadata. Thus, the remote message archive that is assembled based on change sets and message transmissions to and from a mobile device typically includes various types of metadata.

The metadata serves as the basis for identifying where the text message originates from and the time that the text message sent. This metadata can be mined using the client application or the processing server (or other peers) in various embodiments. For example, a user can search on all of the messages that contain the word "experiment" that were received from the user's company's research group in Phoenix, Ariz. Coupled with these data mining features are various alerts that can be integrated in all of the systems and methods disclosed herein as appropriate for a given embodiment. Alerts can be by any mode such as e-mail, a text message, a pop up initiated by the client application or a phone call. In addition, alerts can be generated in response to various triggers or trigger events. For example, a specific alert can be triggered by keywords, location, ID of the recipient, voice stress, or which Internet web page is accessed using the device, or any other suitable mobile device performable event.

In one example, the mobile device can be used in any field where messages or photos are beneficial or desired as part of a user's job function. For example, the system and methods disclosed herein can be used by appraisers, insurance claims adjusters, inspectors, law enforcement personnel, suppliers, bidders, and various other professionals. In each instance, a user of the device can generate local data by taking pictures, dictating messages, sending text messages, and performing other device-related activities. This local data can be combined with the querying and fillable form functionality described above to prepare reports relating to a particular project, such as a crime scene review by a law enforcement officer or an inspection of fire by an insurance claim adjuster to generate an electronic project specific route. The routing and data collection features of the methods and systems described herein allow for this information to be sent to a supervisor or for a supervisor to have direct access to and track the mobile devices of their employees in the field.

Thus, in one specific embodiment, if an employee has a supervisor and the employee is taking pictures in the field, the preferences in the device can be such that the pictures are automatically routed to the supervisor. Thus, the fact that the data type is "picture" and that it was taken during working hours is sufficient to affect automatic routing in some embodiments. In another embodiment, when a picture is taken, such as of a wrecked car, the mobile device queries (e.g., via a pop-up window) the user as to the amount of the damage, the name of the object, or the name of the owner of the object, and relays that information to the supervisor or a server at the employer's computer facility. The relevant information associated with a given employee's project can also be sent via text message for remote processing into a project report.

In addition, certain information can also be applied to data generated or routed using the mobile device retrospectively at a later time at the archive or processing peer. For example, a user can inform a processing peer or server, such as a photo archive, by stating via text message or fillable form that on a particular day and/or between specified hours the user was on vacation at a particular vacation destination, such as Spain. Thus, the system can retroactively associate metadata with pictures that were created in this data range, and identify them as vacation pictures taken in Spain or the relevant location of interest.

As shown in FIG. 5B a peer to peer (or client server) based system 216 illustrated suitable for use with a mobile device 202 and a message archive 218 or a message processor 218. Consistent with the other embodiments discussed above, the mobile device 202 is in communication with a plurality of peers, Peer 1 ... Peer n.

In addition, FIG. 5B shows that the message archive 218 is in bidirectional communication with various modules. These modules include a text to speech module 220, a metadata processing module 222, a search module 224, a location data module 226 and a mobile device interface and translation module 228. Prior to discussing each module in detail, it is informative to consider the message processor that uses them.

In one embodiment, the message processor is peer connected to one or more networks. The message processor typically accesses messages that have been archived from the mobile device 202 and performs various processes relative to the message using different modules to produce new valued added content derived from the archived messages.

In one embodiment, the message processor 218 can be implemented using a "push" or a "pull" based data delivery system. For example, the message processor can receive a request from a mobile device 202 (a pull request) to perform a certain function and connect with the relevant module to perform that function and route the value added content. Alternatively, as an example, a supervisor user can set an alert that requests that when an employee user of the system 216 completes a business trip all of the employees' phone logs and text message are "pushed" to the supervisor's mobile device.

Various modules suitable for processing and adding value to the message archive and processor 218 based system 216 are shown in FIG. 5B. The control module 219 responds to user commands and client application interface controls to access other modules and initiate different types of message processing. Thus, in the example provided above wherein a text message is sent to the processing server to run a remote search, the control module 219 processes the text message, starts the related processing, and routes the result.

In turn, the text to speech module 220 enables archived messages to be converted to audio files that can then be routed and listened to when speech is preferable to reading. Thus, if a user of the mobile device wants one or more archived text messages to be converted to speech and sent to a colleague, the mobile device 202, via the client application, either directly or indirectly connects with the message processor or the text to speech module to have this task performed and the resultant files formatted and sent via the appropriate network or peer collection.

As discussed above, the message archives described herein stored metadata as well as the actual messages. Numerous examples of the role of metadata in searching and location based information gathering have been provided. In one embodiment, it is the metadata processing module 222 that handles tasks of this nature in response to requests from the client application, the control module 219, or the processor 218.

Similarly, various local and remote searching can be performed relative to the message contents and their associated metadata. For these operations, the search module 224 can be used in conjunction with other modules and system components as appropriate. The importance of GPS and cellular tower triangulation to generate location information and metadata about where events take place is discussed throughout and in more detail below with respect to FIGS. 6A and 6B. The location data module 226 handles many of these location data specific tasks in conjunction with other modules and system components.

Finally, as shown in FIG. 5B a mobile device interface and translation module 228 is shown. This module 228 coordinates with other mobile devices and various stored pieces of metadata to properly communicate with other mobile devices that include client applications as well as to ensure that when data is sent to other devices it is presented in a suitable format for viewing on any such device.

For example, if a text message has just been sent to a first user of the system 216, and the first user wants to have this text message sent to a second user the interface and translation module 228 handles this task. The module 228 is configured to handle this message exchange such the text messages appears in the second user's Blackberry as though it was sent to him directly while still referencing metadata that tells the second user that the text was forwarded by the first user.

These specific modules are not intended to limit the functionality of the invention. For each possible application described herein and any others that can be implemented, using a client application and a processing peer as discussed above, corresponding modules can be implemented on various peers that connect to the processor 218.

As suggested throughout the document, for various embodiments of the invention location based data can be used to filter metadata and identify the source of a given message, mobile device event, or to track the location of the user of the mobile device. The metadata processing module 222 and the location data module 226 can communicate together via the message processor 218 to implement these features.

Figure 6A:
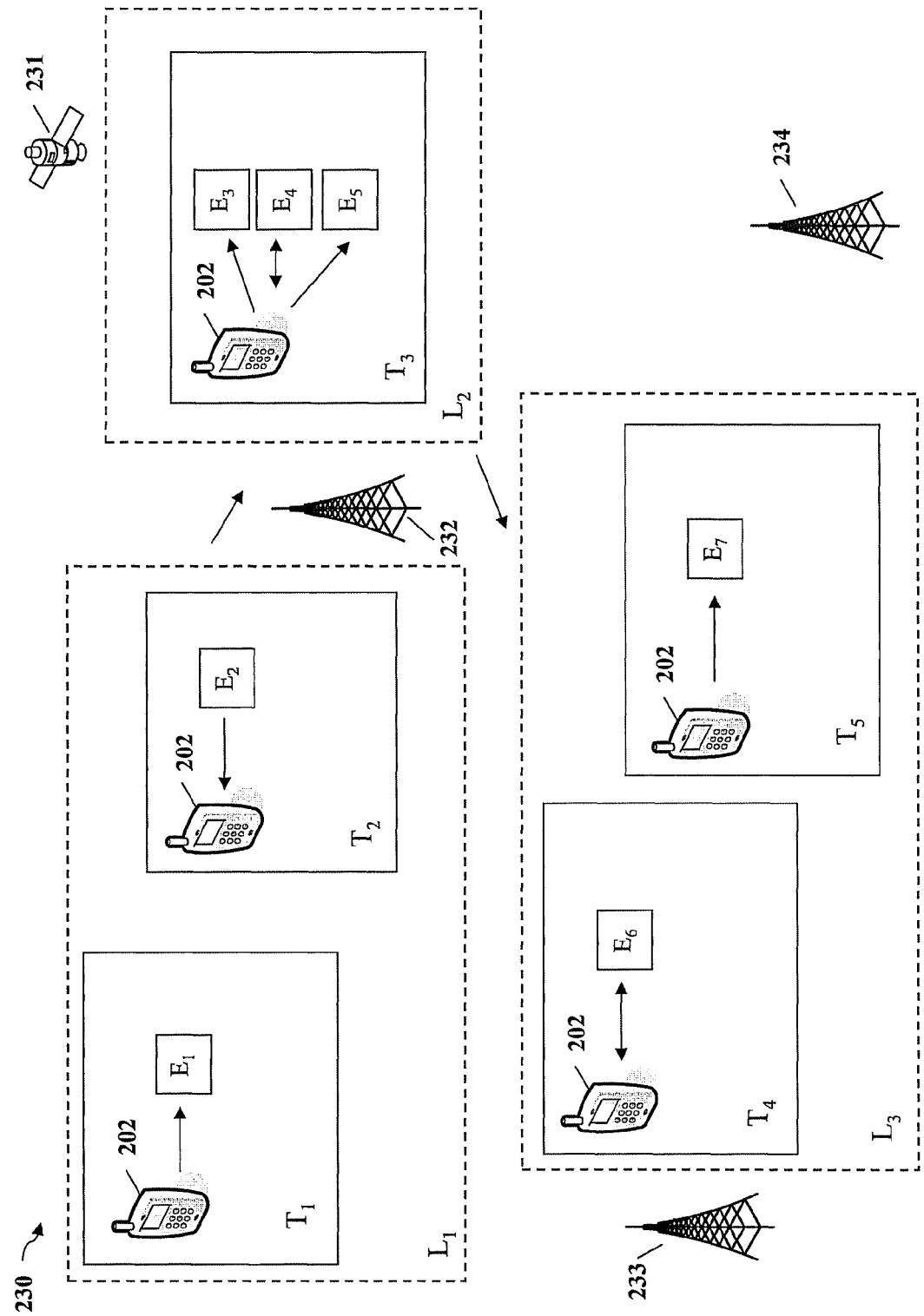
FIG. 6A is a diagram illustrating a peer to peer based system suitable for implementing a location and event tracking embodiment of the invention.
Figure 6B:
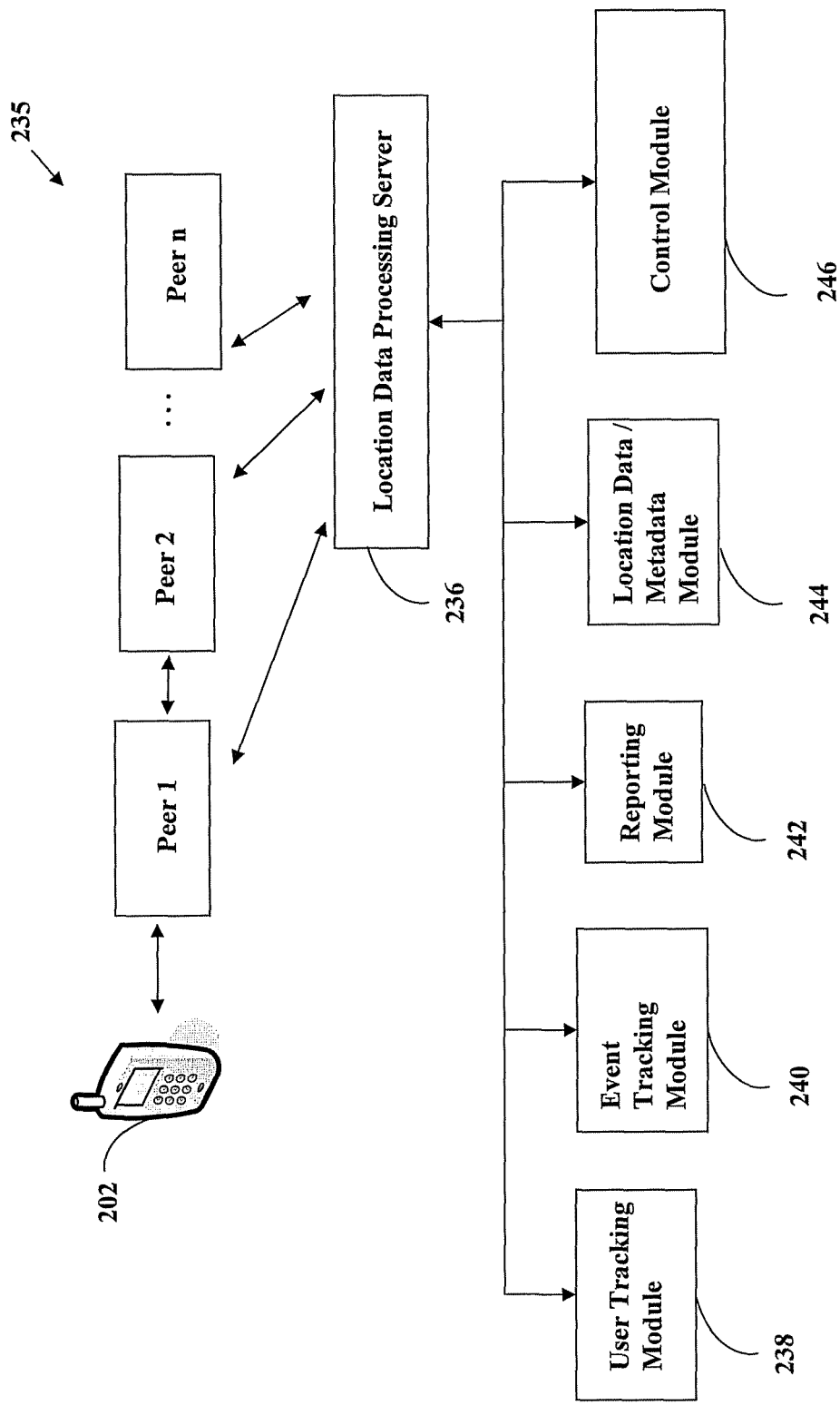
FIG. 6B is a diagram illustrating various data processing modules suitable for use with a peer to peer based location and event tracking embodiment of the invention.

A high level diagram illustrating examples of these location specific features and specific modules relating to location, event, and tracking features are shown in FIGS. 6A and 6B, respectively. These features can also be used to monitor a device user, such as a child, by a third party, such as a parent, on a real time or periodic basis according to the method of FIG. 7. In one embodiment, the inclusion of tracking and monitoring features allows various mobile devices used with remote peers to possess an internal temporal and spatial memory.

FIG. 6A shows a system 230 that includes various features and functions. For example, the system 230 includes location based functionality, including the ability to make the mobile device 202 (for example a mobile phone) a unit for a tracking and mapping the location of the user. Specifically, in FIG. 6A, a user and event tracking system 230 suitable for use with a mobile device 202 that can track the device 202 between a plurality of different locations and monitor different events is shown. As used herein the events include mobile device actions undertaken at one or more locations. Events are typically incoming (such as the receipt of a text) or outgoing (such as sending an email message). In the figure, three exemplary different locations $L_1$, $L_2$, and $L_3$ are shown. However, the methods and systems described herein can track a mobile device 202 through any number of locations throughout the world.

Since certain mobile devices 202 include global positioning system chipsets, those types of devices 202 can be tracked using a GPS satellite system 231. For devices that lack a GPS chipset or for circumstances when the level of resolution provided by GPS systems 231 is unnecessary, cell tower identification triangulation and related cell tower based location tracking techniques can be employed. As shown in FIG. 6A, three cellular towers 232, 233, and 234 are shown that are suitable for triangulating the position of the mobile device 202 using techniques known in the location based services industry.

In addition to providing a mechanism to generate location specific metadata for event tracking and to track a user's position, location information is also used to enhance the operation of change set and data flows between the client application and the relevant peers.

Thus, if a user wants to remotely process a photo using a processing server with respect to the system 10 of FIG. 1, location data can be used to select between differently located peers. Thus, if someone is in Europe and wants to process a photo or create a portfolio of text message remotely, the location data helps the system operate more efficiently by directing the change set data and the underlying to be processed data portions to a European peer or server rather than one in the United States.

Returning to FIG. 6A, at each location in the examples shown in the figure, different events occur with respect to different points in time that occur with respect to the mobile device. For example, at location $L_1$, at time $T_1$, the mobile device 202 experiences a first event $E_1$. The first event $E_1$ shown is an outgoing event. The second event $E_2$, occurring at time $T_2$, shown is an incoming event. Thus, in one embodiment the first event $E_1$ may be the sending of a text message from the mobile device 202 to a user contact. Similarly, the second event $E_2$ may be the receiving of a responsive text message from a colleague in response to $E_1$. In general, an event can be incoming or outgoing. Certain events may be classified as bi-directional, such a voice phone call. However, the underlying metadata will indicated who initiated the call.

Alternatively, some events such as taking a picture or forwarding a text message may be classified only based on the metadata that explains all of the parties and events involved in the transaction along with where and when it happened. Further, an event can include but is not limited to, sending or receiving a message; initiating or answering a call; or otherwise performing any action available using the operating system of a given mobile device.

In addition, as shown in FIG. 6A, at new location $L_2$, starting at time $T_2$, and three events $E_3$, $E_4$, $E_5$, are performed or generated using the mobile device 202. Although the first event $E_3$ may commence at time $T_2$, the other events may happen later with their own time stamped metadata or all three events may happen simultaneously. Further still at the third location $L_3$, and the fourth location $L_4$, at times $T_4$ and $T_5$, respectively, separate events $E_6$ and $E_7$ occur. The system 235 discussed in more detail with respect to FIG. 6B allows all of the events to be tracked and reported.

In each case, for each location, time and event, whether by triangulating between the cellular towers or via the GPS satellite 231 generated positional information, metadata corresponding to the user location and each mobile device specific event is generated and associated with the underlying files and logs that are ultimately sent to a processing server or application such as that shown in FIG. 6B.

Specifically, FIG. 6B shows a peer to peer (or client server) based system 235 suitable for use with a mobile device 202 and a location data processing server 236. In addition, the system includes various modules as shown that can be implemented as individual peers or as software resident within the server 236. In one embodiment, the system 235 includes, but is not limited to including a user tracking module 238; an event tracking module 240; a reporting module 242; a location data/metadata module 244; and a control module 246. The location data processing server 236 can be any of the peers or servers discussed above that are suitable for storing and exchanging data with a client application resident on the mobile device 202.

As was the case with the embodiment of FIG. 5B, the control module 246 responds to user commands and client application interface controls to access other modules and initiate different types of location based services including user and event tracking. In one embodiment, the control module 246 is the main interface point of the server 236 or peer 236 for the client application resident on the mobile device 202.

In turn, the location data/metadata module 244 receives the relevant GPS information or other location related metadata or assists in obtaining the position of the mobile device given information about the position of the cellular towers in the surrounding area. In one embodiment, the mobile device 202 captures various signals from surrounding cell towers and uploads the cell tower ID for each tower to which it connects to the location data module 244. Since the positions of the cell towers are known the module 244 can collect any ancillary information that it needs and directly or indirectly calculate the location of the mobile device 202. When the local messages or other data is sent from the mobile device to the server 236, the associated metadata includes positional information that was determined on the phone (such as GPS data) or by using the location data module and sending location information back to the device 202.

In one embodiment, since the process of triangulation can be time and processor demanding, in one embodiment multiple peers are used to assist in the process to make the location available to the end-user in a reasonable time period. Thus, in one embodiment, the cell tower information that is collected using the mobile device is routed to a plurality of peers that are programmed to obtain longitude and latitude from their cell towers. This plurality of peers performs a triangulation and sends it back to the device 202 and/or the server 236. This process can be performed using any of the systems herein and is not limited to message processing embodiments.

In addition to the general location data module 244, the location data processing server can also connect to or have installed within it a user tracking module 238 and event tracking module 240. The user tracking module 238 uses the location information made available to track the mobile device 202 and thus its user. The user tracking module may interact with the reporting module 242 to facilitate the generation of alerts, real time tracking, and periodic user report generation. Similarly, the event tracking module performs similar tracking functions with events, such as phone calls, message sending, message receiving, and other functions performed using the mobile device 202 such that location data can be associated with all events as appropriate for a given tracking application.

With respect to FIG. 6A, all of the event times and locations shown can be broadcast in real time to a tracking party, such as a parent of the mobile device user. In one embodiment, the tracking party provides the mobile device with an undetectable version of the client application that sends alerts and other information to the tracking party. Alternatively, all of the events, movements, and the named parties can be compiled into one report that highlights information of greater interest, such as the highlighting of drug references, other illegal activities, or certain key textual words or auditory sounds. Any real time or periodic reporting is handled by the reporting module 242 or other peers.

In addition, specific details regarding operating in real time mode or in periodic mode are discussed in more detail below. The reporting module 242 also handles alerts such as sending a message to an end user that a particular key word or that voice distress was detected on a phone call. Thus, in one embodiment a voice stress analyzer module or routine and a voice recognizer operates to filter stress signals from phone conversions conducted over the mobile device and trigger alerts as appropriate based on stress or various key words.

Figure 7:
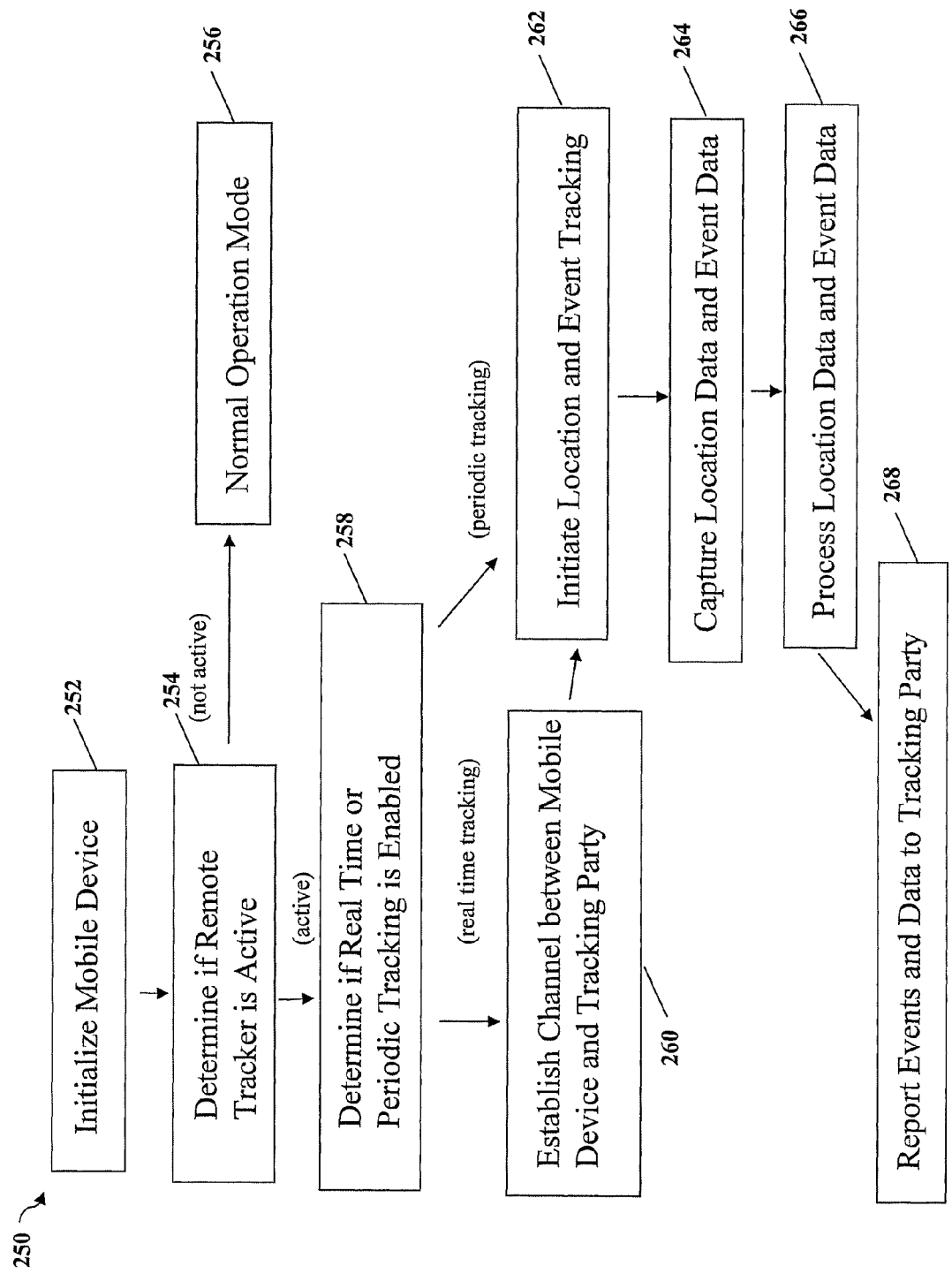
FIG. 7 is a diagram illustrating a plurality of steps suitable for implementing either a real time or periodic third party tracking embodiment of the invention.
Figure 8A:
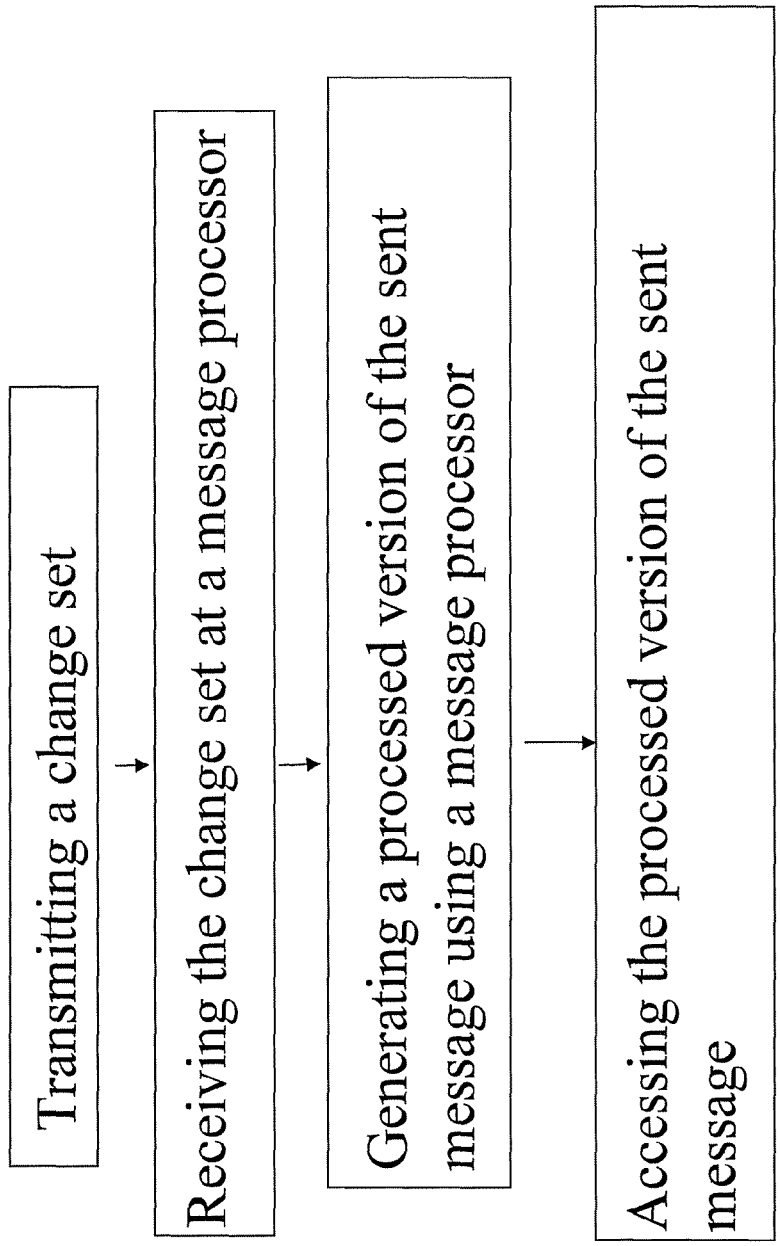
FIGS. 8A-8C are flow diagrams illustrating three methods according to different embodiments of the invention.
Figure 8B:
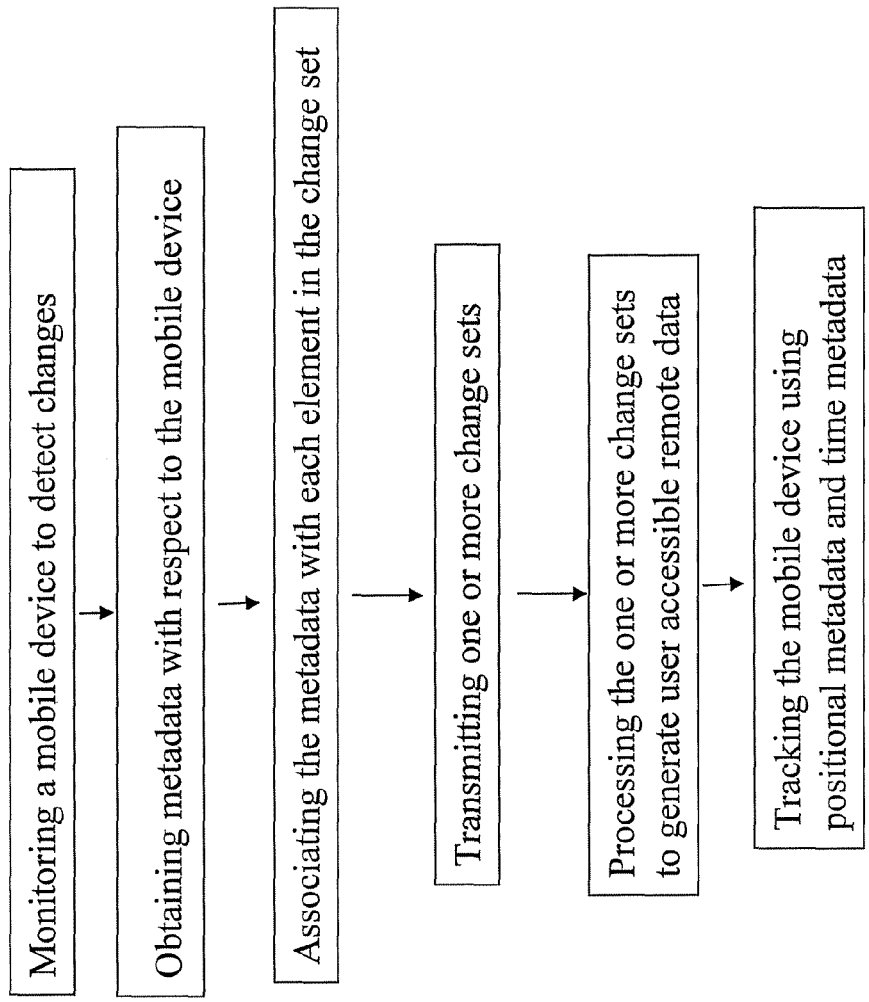
Figure 8C:
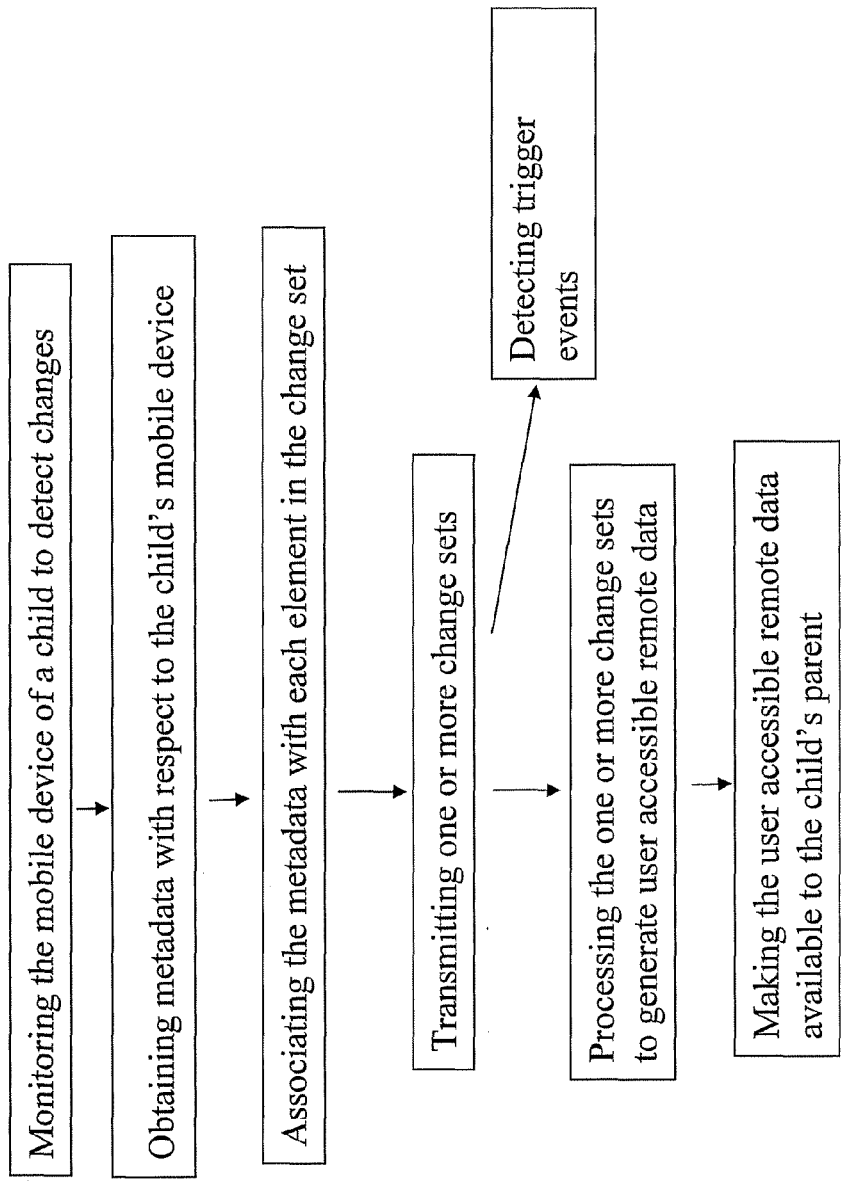

In general, the tracking system 230 and 235 can be implemented to support numerous commercial and personal tracking objectives. As smart phones and other mobile devices become the principal mode of communication among adults, it is also the case that for many young adults and children, mobile devices are an integral part of their lives. Another important application of the methods, principles, hardware, software, and systems described herein is to help implement various child protection features, such as tracking and monitoring. An exemplary system suitable for implementing certain child protection features and child tracking features was discussed above with respect to FIGS. 6A and 6B, a specific implementation of a related method is shown in FIG. 7. In addition, FIGS. 8A-8C also show specific message archiving, metadata specific, and child tracking methods.

Specifically, certain child protection features includes location monitoring, alert generation in response to key words or voice stress, determining with whom the child communicates and by what mode (text, email, calls, etc.) and reporting the same to the mobile devices or other peer devices under the control of parents or guardians.

FIG. 7 shows a method suitable for use with the various peer to peer (or client server) based system discussed above that can transmit user data and track user data using the GPS or cellular tower triangulation techniques. Specifically, FIG. 7 includes a plurality of steps suitable for implementing a third party mobile device user monitoring method 250 system using either a real time or periodic approach. Real time monitoring is an attempt to send messages or alerts about the mobile device user's activities as they happen. In contrast, the periodic monitoring approach may generate reports about a mobile device user over a prescribed period of time, such as a business traveler's calls and activities for a period of time.

As shown in FIG. 7, the first step in the process is for the user of interest, that is the mobile device user that is being tracked or monitored by a third party, to activate or initialize their mobile device (step 252). In one embodiment, the mobile device has been configured to include a version of the client application that runs transparently in the background such that the user of the device is not aware they are being monitored. For certain business purposes or where deterrence from certain activities is encouraged, such as excessive text messaging, the monitoring program can be made visible to the user of the mobile device.

The following steps are typically performed by a remote peer device or by the client application on a mobile device of interest for tracking purposes. The next step is to determine if a remote tracker is active application (step 254). The tracking party (such as a parent) that is interested in the movements and activities of the mobile device user (such as a child) can toggle between whether or not remote tracking is engaged. If remote tracking is not active, the mobile device is in normal operation mode (step 256). In contrast, if the tracking party wants real time or periodic reports about the activities of the mobile device, the tracker is determined to be active and the next step is a selection step.

At this point in the process, the client application or a remote peer, such as a parent controlled device, makes a determination as to whether real time monitoring/tracking or periodic monitoring/tracking is active (step 258). If real time monitoring is active, the client application establishes a communication channel between mobile device and tracking party (step 260). This follows because the tracking party needs to receive alerts, status reports, or a mirror window into the events occurring on the mobile device of the tracked party.

Once the channel has been established the steps for periodic tracking and real time tracking are the same, except with respect to the frequency of the report generation, event reporting, and location reporting. With respect to the real time tracking, this type of monitoring allows tracking with respect to every call in and out, every text message in and out, effectively, in one embodiment the tracking part can see everything the tracked party is doing while knowing where they are doing it.

The next step in the process for both real time and periodic embodiments is to initiate location and event tracking (step 262). Next, as change sets vary over time and new activities or location data are generated by the client application, the application captures location data and event data (step 264). In turn, the client application or remote peer or processing server processes the location data and event data (step 264) and report events and data to tracking party (step 268) as a periodic report or as real time information and alerts.

Using the systems 10, 30, 200, 216, 230 and 235 the other modules, methods and systems discussed herein, mobile device based monitoring can be achieved that allows a third party, such as a parent in a preferred embodiment, to see everything the mobile device user of interest, typically the relevant parent's child is doing on their cell phone.

In addition, with the searching and data mining functionality of the systems described herein, when certain preselected words come up in a voicemail, or a text message, in one real time embodiment, an alert in the form of a text message can be instantly sent to a parent's cell phone. This is typically achieved by a reporting module such as reporting module 242 in FIG. 6B.

In one embodiment, given the change set and data stream architecture of data exchange between a processing service and the memory resident client application it is also possible to record conversations and send them to the third party that is monitoring the activities of the mobile device user.

In one embodiment, since the client application can already access voicemails and other media files that include audio content, the processing application can be configured to convert a user's voicemail or other audio files, such as dictated memos to text and archive the resultant text at the application server.

In one embodiment, the mobile device includes a location based service that includes GPS functionality. In this embodiment, the client application can access a call log, a GPS tag, and a mapping functionality and use these in conjunction with the processing application to generate different products such as automatically GPS tagged picture archives.

In another embodiment, the client application and related services can be used to monitor mobile device activity. Further, if the mobile device includes location based services, such as services that use GPS data, mobile device position can also be monitored. Thus, it is possible to correlate where a user was located when the client application or related service made or received a call, or performed another action, such as archiving data, using the client application.

As discussed above with respect to various specific embodiments the invention provides, in part, systems and methods that simplify and automate mobile device-based activities. In some embodiments, actions and processing steps occur without a device user needing to click-through a menu or even touch the device. Thus, the invention offers "zero touch" or "zero click" functionality in various embodiments.

The device, software, methods, and systems described herein can incorporate various network-based technologies. In various embodiments, suitable network-based technologies for transmitting and receiving local data and processed versions in thereof include, but are not limited to cellular, infrared (IR), satellite, Bluetooth, wide area network (WAN) and WLAN, Wireless Fidelity (Wi-Fi) such as 802.x standardized systems and are to be used generically when referring of any type of 802.11 network, whether IEEE 802.11b, 802.11a, 802.16, 802.20 dual-band, GPRS, CDMA, EDGE, WCDMA, CDMA2000, TD-SCDMA network, UWB/W-USB, ZigBee, NFC and WiMax.

Embodiments may operate over current mobile communication networks based on either Code Division Multiple Access (CDMA) or Global Systems Mobile (GSM) standards, or other systems. The device network and the internet can be accessed using various protocols and auxiliary networks, including the suitable network-based technologies discussed above.

In addition to the client application resident on the mobile device, an overall service including certain hardware components, such as servers that act as peers or processing elements can also be established to facilitate to the transfer and processing of local data. Servers suitable for performing the processing, routing, transmission, and archiving of local data can use a windows-based operating system, a Mac based, a Linux-based operating system, or any other suitable open source or proprierarty operating system.

The servers may have traditional hardware configurations, each having about two megabytes of RAM; disk space ranging from 120 up to 360 gigabytes of storage. The servers may be wireless or LAN-based. Blade servers can be used in one embodiment.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

We claim:

1. A method for remotely archiving text messages received by a mobile device having a storage element, the method comprising the steps of:

generating a change set comprising changes to data content of the mobile device;

transmitting the change set in response to a single user action, the change set transmitted over a network as a stream of data, the change set comprising message data corresponding to at least one text message, the at least one text message having been generated locally on the mobile device;

receiving the change set at a message processor;

generating a processed version of the at least one text message using the message processor;

receiving input of a randomly generated unique code; and providing access to the processed version of the at least one text message upon receipt of the randomly generated unique code.

2. The method of claim 1 wherein the processed version of the at least one text message is an archival version of the text message.

3. The method of claim 2 further comprising the step of processing the archival version of the text message using a text-to-speech module.

4. The method of claim 2 further comprising the step of processing the archival version of the text message using a metadata processing module.

5. The method, of claim 2 further comprising the step of processing the archival version of the text message using a mobile device translation module.

6. The method of claim 2 further comprising the step of processing the archival version of the at least one text message such that the archival version is associated with location data corresponding to where the at least one text message was generated.

7. The method of claim 1 wherein the step of transmitting the change set is performed automatically when a change in local data resident in the device storage element is detected.

8. The method of claim 1 wherein the mobile device is one of a mobile phone, a smart phone, a media content player, and a personal digital assistant (PDA).

9. The method of claim 1 wherein a client application is installed on the mobile device, the client application configured to send the at least one change set to the message processor, the processor responsive to text messages containing instructions relating to an archive of messages.

10. The method of claim 1 wherein the processed version of the at least one text message comprises metadata configured to be stored in a searchable format.

11. A mobile device-based message data transfer system comprising a remote peer configured to interface with a first application, the first application installed on the mobile device, the mobile device containing a change set comprising local message data including changes to data content of the mobile device, the local message data comprising text messages;

the remote peer comprising:
    a local message data receiving module configured to receive and process the local message data received from the mobile device;
    a processing element, the processing element configured to process the local message data to generate processed message data; and
    a remote storage element configured to store the processed message data;

wherein the remote peer is configured to provide access to the processed message data upon receipt of a randomly generated unique code.

12. The system of claim 11 wherein the processed message data includes archival versions of the text messages.

13. The system of claim 12 wherein the remote peer further comprises a text-to-speech module configured to process the archival version of the text message to generate an audio file.

14. The system of claim 12 wherein the remote peer further comprises a metadata processing module configured to process the archival version of the text message and store any associated metadata in a searchable format.

15. The system of claim 12 wherein the remote peer further comprises a location data module that processes the archival version of the text message such that it is associated with location data corresponding to where the message was generated.

16. The system of claim 11 wherein the remote peer further comprises a mobile device translation module configured to process data in formats suitable for other mobile devices.

17. The system of claim 11 wherein the mobile device is one of a mobile phone, a smart phone, a media content player, and a personal digital assistant (PDA).

18. A method of providing remote access to data generated by a mobile device having a device storage element, the method comprising the steps of:

monitoring the mobile device such that changes in local data resident in the device storage element are detected using a client application installed on the mobile device, wherein the changes in the local data accumulate during a period of time to comprise at least one change set comprising the changes;

obtaining metadata with respect to the mobile device periodically in response to changes in the local data;

associating the metadata with each element in the change set such that each element can be linked to and searched with respect to the metadata;

transmitting the at least one change set over a network;

receiving the at least one change set at a remote peer, the remote peer having a remote storage element;

processing the at least one change set using a remote peer application to generate user accessible remote data;

receiving input of a randomly generated unique code; and providing access to the user accessible remote data upon receipt of the randomly generated unique code.

19. The method of claim 18 wherein the metadata is selected from a group consisting of: user name, change set data, event data, local data, contextual data, spatial data, calendar data, seasonal data, temporal data user identifiers, IMEI numbers, derived data, GPS data, location data, spatial data, user captured data, user settings, directional data, sensor data, temperature data, accelerometer data, pressure data, weather data, job specific data, insurance adjuster data, law enforcement data, organizational data, picture data, message data, remote control instructional data, routing data, form captured data, survey data, user modified data, and pricing data.

20. The method of claim 18 wherein the user accessible remote data is selected from a group consisting of: a digital photo album, a barcode database, a browser accessible digital photo archive, a text message archive, an email archive, an instant messaging archive, a call archive, a voicemail archive, and an archive of mobile device generated files.

21. The method of claim 20 further comprising the step of displaying user accessible remote data using a scrollable chronological interface.

22. The method of claim 18 wherein the metadata comprises temporal data and positional data.

23. The method of claim 22 further comprising the step of linking the temporal data and the positional data with each element in the change set such that each element can be tracked as to where and when it was created.

24. The method of claim 23 further comprising the step of tracking the mobile device using the temporal data and the positional data.

25. The method of claim 23 further comprising the step of monitoring changes in the local data using the temporal data and the positional data, the changes in local data indicative of a user action.

26. The method claim 23 wherein the positional data is obtained using cellular tower signals.

27. The method of claim 22 further comprising the step of tracking the mobile device by reporting the generation of local data, a corresponding location to where the local data was generated, and a corresponding time as to when the local data was generated.

28. The method claim 27 wherein the step of tracking is performed in real time.

29. The method claim 27 wherein the step of tracking is performed periodically in response to a tracking party's specification.

30. The method claim 22 further comprising the step of generating an alert that is sent to a third party in response to detecting a trigger event associated with the local data.

31. The method claim 30 wherein the trigger event is selected from the group consisting of a keyword, voice stress, reference to illegal activities, accessing a web page, a change in mobile device position, loss of mobile device signal, a call, an email, a text message, and an increase in event generation.

32. The method of claim 22 further comprising the step of searching the metadata remotely using a browser.

33. The method of claim 22 further comprising the step of automatically routing local data generated by an employee to a remote computer.

34. A mobile device-based data transfer system comprising
a remote peer configured to interface with a first application, the first application installed on the mobile device, the mobile device containing a change set comprising local data including changes to data content of the mobile device, the local data comprising mobile device generated and received files;
the remote peer comprising:
a local data receiving module configured to receive and process the local data received from the mobile device;
a metadata processing module configured to receive metadata associated with changes in the metadata of the mobile device;
a processing element, the processing element configured to associate the metadata with the local data and generate processed data that comprises the metadata and at least a portion of the local data; and
a remote storage element configured to store the processed data;
wherein the remote peer is configured to provide access to the processed message data upon receipt of a randomly generated unique code.

35. The system of claim 34 wherein the metadata comprises location data and time data and the metadata processing module is configured to process the metadata regarding the local data's time and location of generation and store any associated metadata in a searchable format.

36. The system of claim 34 wherein the metadata is selected from a group consisting of: user name, change set data, event data, local data, contextual data, spatial data, calendar data, seasonal data, temporal data, user identifiers, IMEI numbers, derived data, GPS data, location data, spatial data, user captured data, user settings, directional data, sensor data, temperature data, accelerometer data, pressure data, weather data, job specific data, insurance adjuster data, law enforcement data, organizational data, picture data, message data, remote control instructional data, routing data, form captured data, survey data, user modified data, and pricing data.

37. The system of claim 34 wherein the metadata processing module is configured to track the mobile device by reporting the generation of local data, a corresponding location to where the local data was generated, and a corresponding time as to when the local data was generated.

38. The system of claim 34 wherein the processed data includes an archival version of the local data.

39. The system of claim 34 wherein the remote peer further comprises a mobile device translation module to process data in formats suitable for other mobile devices.

40. The system of claim 34 wherein the remote peer further comprises a reporting module configured transmit alerts in response to a trigger event.

41. The system of claim 40 wherein the trigger event is selected from the group consisting of a keyword, voice stress, reference to illegal activities, accessing a web page, a change in mobile device position, loss of mobile device signal, and an increase in event generation.

42. The system of claim 34 wherein the mobile device is selected from the group consisting of: a mobile phone, a smart phone, a media content player, and a personal digital assistant (PDA).

* * * * *